US011470293B2

(12) United States Patent
Park et al.

(10) Patent No.: US 11,470,293 B2
(45) Date of Patent: Oct. 11, 2022

(54) ELECTRONIC DEVICE FOR ADJUSTING IMAGE QUALITY OF DISPLAY DEVICE AND METHOD FOR OPERATING THE SAME

(71) Applicant: SAMSUNG ELECTRONICS CO., LTD., Suwon-si (KR)

(72) Inventors: Jaesung Park, Suwon-si (KR); Jiman Kim, Suwon-si (KR); Junhee Woo, Suwon-si (KR); Seongwoon Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/458,022

(22) Filed: Aug. 26, 2021

(65) Prior Publication Data

US 2022/0086409 A1 Mar. 17, 2022

Related U.S. Application Data

(63) Continuation of application No. PCT/KR2021/011375, filed on Aug. 25, 2021.

(30) Foreign Application Priority Data

| Aug. 26, 2020 | (KR) | 10-2020-0107551 |
| Dec. 10, 2020 | (KR) | 10-2020-0171990 |
| Jun. 28, 2021 | (KR) | 10-2021-0083968 |

(51) Int. Cl.
*H04N 9/31* (2006.01)
*G09G 3/20* (2006.01)

(52) U.S. Cl.
CPC ............ *H04N 9/3194* (2013.01); *G09G 3/20* (2013.01); *H04N 9/3182* (2013.01);
(Continued)

(58) Field of Classification Search
None
See application file for complete search history.

(56) References Cited

U.S. PATENT DOCUMENTS 8,736,674 B2 * 5/2014 Hovanky ............. H04N 13/257
348/51
9,501,841 B2 11/2016 Yang
(Continued)

FOREIGN PATENT DOCUMENTS

KR 10-2009-0041695 A 4/2009
KR 10-2009-0122377 A 11/2009
(Continued)

OTHER PUBLICATIONS

International Search Report (PCT/ISA/210) and Written Opinion (PCT/ISA/237) dated Nov. 23, 2021 issued by the International Searching Authority in International Application No. PCT/KR2021/011375.
(Continued)

*Primary Examiner* — Duane N Taylor, Jr.
(74) *Attorney, Agent, or Firm* — Sughrue Mion, PLLC

(57) ABSTRACT

An electronic device and a method of controlling the same are provided. The electronic device may include a display; a communication circuit; a camera; and at least one processor configured to: based on an execution of a compensation application for performing compensation on an image of a display device, control the display to output guide information including an interface indicating the electronic device to move to meet an image capturing condition for capturing an image of a partial area of a display device connected through the communication circuit; and based on the compensation of the image of the display device being completed, output
(Continued)

a first image of the display device before the compensation and a second image of the display device after the compensation.

15 Claims, 29 Drawing Sheets

(52) U.S. Cl.
CPC ............... *G09G 2320/0666* (2013.01); *G09G 2320/0693* (2013.01); *G09G 2354/00* (2013.01)

(56) References Cited

U.S. PATENT DOCUMENTS

| | | | | |
|---|---|---|---|---|
| 9,990,749 | B2* | 6/2018 | Kunkel | ................ G06K 9/6201 |
| 2008/0031514 | A1 | 2/2008 | Kakinami | |
| 2008/0062274 | A1* | 3/2008 | Hamamura | ...... H04N 5/232935 |
| | | | | 348/223.1 |
| 2008/0246781 | A1 | 10/2008 | Surati et al. | |
| 2010/0259686 | A1* | 10/2010 | Kao | ......................... H04N 9/73 |
| | | | | 348/658 |
| 2012/0074851 | A1 | 3/2012 | Erinjippurath | |
| 2012/0127324 | A1* | 5/2012 | Dickins | ................. H04N 17/04 |
| | | | | 348/191 |
| 2013/0016081 | A1 | 1/2013 | Park et al. | |
| 2017/0075638 | A1 | 3/2017 | Poornachandran et al. | |
| 2018/0190214 | A1 | 7/2018 | Kim et al. | |
| 2019/0041269 | A1 | 2/2019 | Hwang et al. | |
| 2019/0204220 | A1 | 7/2019 | Jang et al. | |
| 2019/0373206 | A1 | 12/2019 | Kang et al. | |
| 2020/0035195 | A1 | 1/2020 | Maeng et al. | |
| 2020/0320927 | A1 | 10/2020 | Baek et al. | |

FOREIGN PATENT DOCUMENTS

| | | |
|---|---|---|
| KR | 10-20130007778 A | 1/2013 |
| KR | 1020130011178 A | 1/2013 |
| KR | 10-2014-0126606 A | 10/2014 |
| KR | 10-2016-0014759 A | 2/2016 |
| KR | 1020160015789 A | 2/2016 |
| KR | 10-2018-0042030 A | 4/2018 |
| KR | 1020180078713 A | 7/2018 |
| KR | 10-2019-0035268 A | 4/2019 |
| KR | 1020190138560 A | 12/2019 |
| WO | 2019235766 A1 | 12/2019 |

OTHER PUBLICATIONS

Fingas, J., "Samsung's Latest experiments include a phone app to calibrate your TV", Jan. 6, 2021, 3 pages, https://www.engadget.com/samsung-c-lab-2021-experiments-154116592.html.
"Automated TV Calibrators", 47SPORTSCLUB, Jan. 8, 2021, 1 page, https://47sportsclub.com/automated-tv-calibrators.
Centofanti, D.P., "Samsung studia un'app che permette di calibrare il TV con il proprio smartphone", Jan. 13, 2021, 2 pages, https://www.dday.it/redazione/38162/samsung-studia-unapp-che-permette-di-calibrare-il-tv-con-il-proprio-smartphone.
Archer, J., "New Samsung Diy Tv Calibration App Promises Perfect Pictures For All", Jan. 24, 2021, 7 pages, https://www.forbes.com/sites/johnarcher20/Jan. 21, 24/new-samsung-diy-tv-calibration-app-promises-perfect-pictures-for-all/?sh=203c67475585.

* cited by examiner

510

520

530

ELECTRONIC DEVICE FOR ADJUSTING IMAGE QUALITY OF DISPLAY DEVICE AND METHOD FOR OPERATING THE SAME

TECHNICAL FIELD

The disclosure relates to an electronic device for adjusting the image quality of a display device and a method for operating the same.

BACKGROUND ART

To adjust the image quality of a display device, image-based measuring devices or other professional devices may be used. However, these devices are too expensive for individual users to obtain and use.

To address this issue, there have been proposed methods for adjusting the image quality of a display device using an electronic device. Specifically, the image quality of the display device may be adjusted by the electronic device using a method of converting a screen capture of the display device by the electronic device into a screen capture of the display device by an expensive measuring device.

As the display device provides only fixed image quality setting information from the manufacturer of the display device, a user of the display device is only capable of adjusting the image quality of the display device according to a predetermined image quality setting information provided by the manufacturer regardless of the user's preference.

DISCLOSURE

Technical Problem

However, each camera included in the electronic device has a different degree of light perception, and each display device has different light emitting characteristics. Thus, it may be difficult to obtain a precise and uniform measurement, despite using an equation for converting a screen capture of the display device pre-generated by the electronic device into a screen capture of the display device obtained by an expensive measuring device.

Technical Solution

According to an embodiment, there is provided an electronic device, including: a display; a communication circuit; a camera; and at least one processor configured to: based on an execution of a compensation application for performing compensation on an image of a display device, control the display to output guide information including an interface indicating the electronic device to move to meet an image capturing condition for capturing an image of a partial area of a display device connected through the communication circuit; and based on the compensation of the image of the display device being completed, output a first image of the display device before the compensation and a second image of the display device after the compensation.

The at least one processor is further configured to: based on the compensation application being executed, output a plurality of image compensation modes for compensating the image of the display device; and based on receiving a command for selecting one of the plurality of image compensation modes, control the display to output the guide information including the interface indicating a direction in which the electronic device needs to move to meet the image capturing condition for image capturing the partial area of the display device.

The at least one processor is further configured to: based on the image capturing condition being met in a first image compensation mode among the plurality of image compensation modes, control the display to display a progress of performing a first image compensation method corresponding to the first image compensation mode on the display device during a first image compensation time; based on the image capturing condition being met in a second image compensation mode among the plurality of image compensation modes, control the display to display a progress of performing a second image compensation method corresponding to the second image compensation mode on the display device during a second image compensation time; and based on the image capturing condition being met in a third image compensation mode among the plurality of image compensation modes, control the display to display a progress of performing a third image compensation method corresponding to the third image compensation mode on the display device during a third image compensation time, wherein the first image compensation time, the second image compensation time, and the third image compensation time are different, and wherein each of the first image compensation method, the second image compensation method, and the third image compensation method includes at least one image quality adjustment component for performing the compensation of the image of the display device.

The first image compensation method, the second image compensation method, and the third image compensation method, each include an image adjustment component among the at least one image adjustment component that is different from each other.

The at least one processor is further configured to: based on the image capturing condition being met in the first image compensation mode, obtain a third image including the partial area of the display device using the camera; and control the display to display the progress of performing the compensation of the image of the display device based on the third image, wherein the partial area of the display device is configured to output a specific image quality pattern corresponding to an image adjustment component included in the first image compensation method.

The at least one processor is further configured to: based on the image capturing condition being met in the second image compensation mode, obtain a fourth image including the partial area of the display device using the camera; and control the display to display the progress of performing the compensation of the image of the display device based on the fourth image, wherein the partial area of the display device is configured to output a specific image quality pattern corresponding to an image adjustment component included in the second image compensation method.

The at least one processor is further configured to: based on the image capturing condition being met in the third image compensation mode, obtain a fifth image including the partial area of the display device using the camera; and control the display to display the progress of performing the compensation of the image of the display device, based on the fifth image, wherein the partial area of the display device is configured to output a specific image quality pattern corresponding to an image adjustment component included in the third image compensation method.

The partial area of the display device includes a specific point for compensating the image of the display device.

According to an embodiment, there is provided a method for operating an electronic device including a display and a camera. The method includes: based on an execution of a compensation application for performing compensation on an image of a display device, outputting, on the display, guide information including an interface indicating the electronic device to move to meet an image capturing condition for capturing an image of a partial area of a display device connected through a communication circuit of the electronic device; and based on the compensation of the image of the display device being completed, outputting a first image of the display device before the compensation and a second image of the display device after the compensation.

The outputting the guide information includes: based on the compensation application being executed, outputting a plurality of image compensation modes for compensating the image of the display device; and based on receiving a command for selecting one of the plurality of image compensation modes, controlling the display to output the guide information including the interface indicating a direction in which the electronic device needs to move to meet the image capturing condition for capturing the partial area of the display device.

The method further includes: based on the image capturing condition being met in a first image compensation mode among the plurality of image compensation modes, controlling the display to display a progress of performing a first image compensation method corresponding to the first image compensation mode on the display device during a first image compensation time; based on the image capturing condition being met in a second image compensation mode among the plurality of image compensation modes, controlling the display to display a progress of performing a second image compensation method corresponding to the second image compensation mode on the display device during a second image compensation time; and based on the image capturing condition being met in a third image compensation mode among the plurality of image compensation modes, controlling the display to display a progress of performing a third image compensation method corresponding to the third image compensation mode during a third image compensation time, wherein the first image compensation time, the second image compensation time, and the third image compensation time are different, and wherein each of the first image compensation method, the second image compensation method, and the third image compensation method includes at least one image quality adjustment component for performing the compensation of the image of the display device.

The method further includes: based on the image capturing condition being met in the first image compensation mode, obtaining a third image including the partial area of the display device using the camera; and controlling the display to display the progress of performing the compensation of the image of the display device, based on the third image, wherein the partial area of the display device is configured to output a specific image quality pattern corresponding to an image adjustment component included in the first image compensation method.

The method further includes: based on the image capturing condition being met in the second image compensation mode, obtaining a fourth image including the partial area of the display device using the camera; and controlling the display to display the progress of performing the compensation of the image of the display device, based on the fourth image, wherein the partial area of the display device is configured to output a specific image quality pattern corresponding to an image adjustment component included in the second image compensation method.

The method further includes: based on the image capturing condition being met in the third image compensation mode, obtaining a fifth image including the partial area of the display device using the camera; and controlling the display to display the progress of performing the compensation of the image of the display device, based on the fifth image, wherein the partial area of the display device is configured to output a specific image quality pattern corresponding to an image adjustment component included in the third image compensation method.

The partial area of the display device includes a specific point for compensating the image of the display device.

Advantageous Effects

According to an embodiment, the electronic device may compensate for the image output from the display device based on response characteristics of the camera included in the electronic device, thereby providing more flexibility in adjusting the image quality of the display device.

According to an embodiment, the display device may automatically recommend the optimal screen setting information corresponding to the user's view environment, thereby improving user experience without manual operations of adjusting screen settings of the display device by a user.

MODE FOR DISCLOSURE

Figure 1:
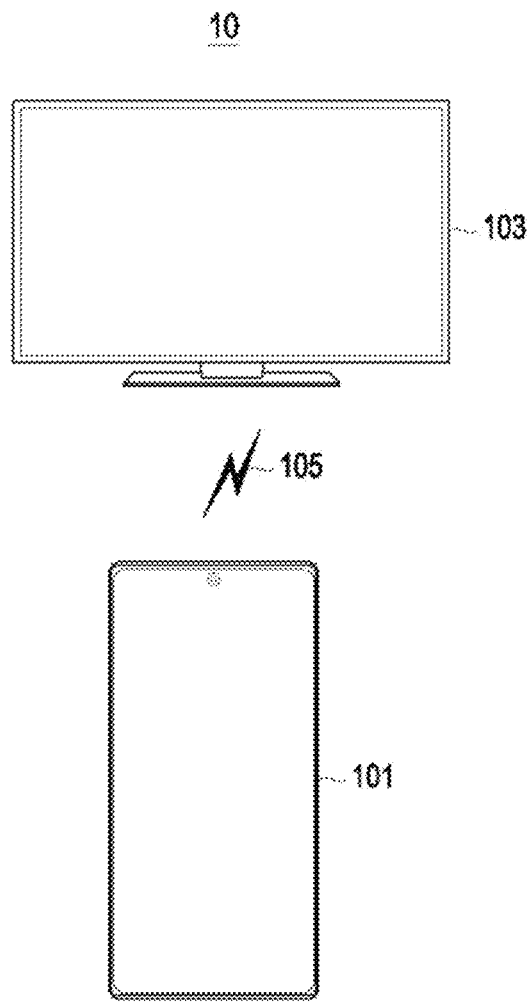
FIG. 1 is a view illustrating a system including an electronic device and a display device, according to various embodiments.

FIG. 1 is a view illustrating a system 10 including an electronic device 101 and a display device 103, according to various embodiments.

The electronic device 101 may be a portable communication device (e.g., a smartphone). The electronic device 101 may include a camera or a communication interface capable of communicating with a camera.

The display device 103 may be an electronic device (e.g., a smart TV) including a panel for displaying screen. For example, the panel included in the display device 103 may be a liquid crystal display (LCD) panel or may be one of the panels including various light emitting devices, such as light emitting diodes (LEDs), organic light emitting diodes (OLEDs), or a cold cathode fluorescent lamp (CCFL). Panels may be implemented as digital TVs, three-dimensional (3D)-TVs, smart TV, LED TVs, OLED TVs, or plasma TVs, and may be not only flat display devices, but also curved display devices or flexible display devices for which curvature is adjustable. The output resolution of the panel may include, e.g., high definition (HD), full HD, ultra HD, 8K ultra HD, or a resolution higher than 8K ultra HD.

The electronic device 101 and the display device 103 may transmit/receive signals through a first communication network 105. The display device 103 may receive a signal for controlling the display device 103 from the electronic device 101, and may adjust the image quality of the display device 103 based on the received signal. According to an embodiment, the electronic device 101 and the display device 103 may transmit/receive signals through a separate display control device connected with the display device 103 via a wired or wireless communication.

The first communication network may be a telecommunications network. The telecommunications network may include at least one of a computer network, the Internet, an Internet of things (IoT) network, or a telephone network. The first communication network 105 may include at least one of communication networks, such as Bluetooth or Wi-Fi, Bluetooth low energy (BLE), infrared communication, and laser beam communication.

The display device 103 may output optical information based on the signal received through the first communication network 105. The output of the display device 103 may vary depending on the adjusted light information of the display device 103.

For example, the display device 103 may output a white pattern so as to facilitate measurement of the luminance output by the display device 103. As another example, the display device 103 may output an R/G/B/Y/M/C screen so as to facilitate measurement of the color output by the display device 103. Further, to facilitate measurement of the gamma output by the display device 103, the display device 103 may output a pattern in which grayscales are sequentially changed at predetermined or specific intervals from a lower grayscale to a high grayscale, e.g., from a black level to a white level. The display device 103 may output a combination of the aforementioned patterns. However, the one or more embodiments are not limited thereto, and the patterns provided above are merely examples and other various patterns of screens not mentioned may be output from the display device 103. Hereinafter, the screen output by the display device 103 is referred to as an image quality measurement pattern.

The electronic device 101 may obtain coordinate information corresponding to the display device from an external electronic device (e.g., a server). For example, the coordinate information corresponding to the display device may represent information for one white point or information about R/G/B/W points.

The electronic device 101 may obtain an image by capturing the image quality measurement pattern output by the display device 103.

According to an embodiment, the electronic device 101 may determine whether the image meets an image capturing condition, and in response to the image satisfying the image capturing condition, the electronic device 101 may capture an image of the image quality measurement pattern output by the display device 103. The image capturing condition may be determined as a reference based on which the image is included in the screen of the camera. The electronic device 101 may determine whether the image meets the image capturing condition including distance and angle between the electronic device 101 and the display device 103. Alternatively, the electronic device 101 may determine whether a specific point corresponding to the display device 103 is included. For example, the specific point may be a point measured to perform compensation when the display device 103 is produced and may be a single white point or R/G/B/W points. The specific point may be determined based on the coordinate information. The specific point may indicate a specific signal level among signal levels (e.g., 0 black to 255 full white).

According to an embodiment, the electronic device 101 may determine whether the image meets the image capturing condition and, in response to the image capturing condition not being satisfied, output guide information for meeting the image capturing condition. The guide information may request a user to move the electronic device to allow the image to be included in the screen of the camera or to allow the distance and angle from the display device to meet the image capturing condition. Specifically, the guide information may include an interface indicating a direction in which the electronic device needs to be moved to correctly capture an image of the display device, thereby satisfying the image capturing condition.

According to an embodiment, the electronic device 101 may determine whether the image meets the image capturing condition and, in response to the image capturing condition not being satisfied, control to automatically meet the image capturing condition if the image capturing condition may be a condition that may automatically be adjusted using software (S/W).

The electronic device 101 may measure the optical information for the display device 103 based on the obtained image. The image obtained by the electronic device 101 may be a red/green/blue (RGB) image.

The electronic device 101 may compensate for the obtained image according to the characteristics of the electronic device 101 (e.g., the characteristics of the camera included in the electronic device 101). The electronic device 101 may obtain camera compensation information corresponding to the electronic device 101 and the display device 103 from an external electronic device (e.g., a server). The electronic device 101 may receive identification information (e.g., a model name) for the display device 103 from the user or may receive identification information from the display device 103. The camera compensation information corresponding to the electronic device 101 and the display device 103 may be compensation information calculated using a first electronic device, which is another electronic device of the same model as the electronic device 101, and a first display device, which is another display device of the same model as the display device. For example, the compensation information may be a compensation function for converting an RGB image obtained by image capturing an image of the first display device by the first electronic device into an XYZ image obtained by image capturing an image of the first display device by a measuring device. Although it has been described that the electronic device 101 obtains camera compensation information corresponding to the display device from the external electronic device, the electronic device 101 may compensate for the response characteristics of the camera using compensation information previously stored in the memory of the electronic device 101.

If a plurality of electronic devices 101 are of the same model, the cameras included in the electronic devices 101 may also be the same model. However, although the cameras of the plurality of electronic devices may be the same model, the cameras may have different response characteristics of optical information perception depending on the sensors and/or lenses included in the cameras. Thus, since each camera may differently perceive the optical information output from the display device, a process for compensating for the response characteristics of the camera may be needed. The response characteristics of the camera may include at least some of color characteristics, luminance characteristics, gamma characteristics, and distribution characteristics. The electronic device 101 may compensate for at least some of the color information, luminance characteristics, gamma characteristics, and distribution information for the image obtained by the camera based on the camera compensation information.

For example, the electronic device 101 may perform luminance compensation to compensate for a difference in the degree to which the sensor of the camera recognizes the intensity of the amount of light output from the display device 103. Thus, the electronic device 101 may compensate for linearity between the amount of light and the sensor.

For example, the electronic device 101 may perform color compensation to compensate for the response characteristics in which the sensor recognizes red, green, and blue for the amount of light output from the display device 103. In other words, the electronic device 101 may compensate for the degree to which the sensor recognizes the RGB values of the amount of light. For example, if the amount of light output from the display device 103 increases, the RGB value of the sensor also increases. However, the degree of recognition of the RGB values may be varied for each sensor included in the camera. Accordingly, the electronic device 101 may perform color information compensation considering response characteristics of the camera.

The electronic device 101 may perform distribution information compensation to compensate for the non-uniformity of the luminance distribution in the camera image due to the vignetting of the camera and/or the viewing angle characteristics of the display device 103. Vignetting refers to a phenomenon in which the periphery or corners of a picture appear dark even with a tiny manufacturing tolerance as the camera's sensor becomes more sensitive. Such vignetting may also occur due to the lens's own vignetting. The light passing through the lens forms a circular image. If the diameter of the image circle of the lens forming this image is shorter than the diagonal length of the captured screen, so no image forms at the corner, vignetting occurs. The electronic device 101 may supplement the measurement performance of a normal camera included in the electronic device 101 through various compensation processes, such as color information compensation, luminance characteristic compensation, gamma characteristic compensation, and distribution information compensation.

The electronic device 101 may compensate for the captured and obtained RGB image based on the camera compensation information, thereby obtaining a compensated image represented with a luminance and color coordinates (XYZ). For example, the camera compensation information may be a compensation function calculated based on the first electronic device and the first display device. The XYZ image obtained by compensating for the captured RGB image based on the compensation information may have an error from the XYZ image obtained by compensating for the image obtained by the first electronic device. Accordingly, the electronic device 101 may correct the compensation function included in the camera compensation information based on the XYZ image obtained by compensating for the captured RGB image and the camera compensation information. The electronic device 101 may recompensate for the RBG image, obtained by image capturing, using the corrected compensation function. Accordingly, the user may generate a measurement image, which is comparable to that obtained by a professional image-based measuring device, using the electronic device 101.

Figure 2:
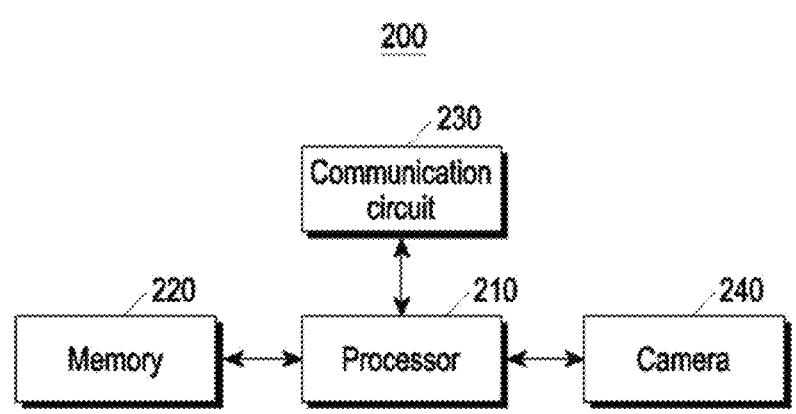
FIG. 2 is a block diagram schematically illustrating a configuration of an electronic device according to various embodiments.

FIG. 2 is a block diagram schematically illustrating a configuration of an electronic device according to various embodiments. Referring to FIG. 2, an electronic device 200 may include a processor 210, a memory 220, a communication circuit 230, and a display 240.

The electronic device 200 may be a portable electronic device and may be implemented as various electronic devices. The electronic device 101 may be capable of taking photos and equipped with communication functionality. For example, the electronic device 200 may include at least one of a smart phone, a tablet PC, a mobile phone, a video phone, an e-book reader, a laptop personal computer (PC), a netbook computer, a personal digital assistant (PDA), a portable media player (PMP), an MP3 player, a wearable device, a smart watch, and a camera with communication functionality.

The processor 210 may control the overall operation of the electronic device 200. The processor 210 may execute, for example, software (e.g., a program) to control at least one other component (e.g., a hardware or software component) of the electronic device 101 coupled with the processor 220, and may perform various data processing or computation. According to one embodiment, the processor 210 may store a command or data received from another component (e.g., the sensor module or communication module or a sensor module) onto a volatile memory, process the command or the data stored in the volatile memory, and store resulting data in a non-volatile memory. According to an embodiment, the processor 210 may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor. For example, when the electronic device 200 includes the main processor and the auxiliary processor, the auxiliary processor may be configured to use lower power than the main processor or to be specified for a designated function. The auxiliary processor may be implemented as separate from, or as part of the main processor.

The processor 210 may control the camera 240 to obtain an image including at least a partial area of the display device. At least the partial area of the display device may be a single white point or an area including R/G/B/W points.

The processor 210 may determine whether an image capturing condition is met before capturing an image including at least the partial area of the display device. The image capturing condition may be whether image capturing is performed including a specific point corresponding to the display device or considering the distance or angle between the electronic device 200 and the display device. For example, the specific point may be a point in the display device 103 to perform compensation. The specific point may be a single white point or R/G/B/W points, and may be determined based on coordinate information.

The processor 210 may compensate for the obtained image based on first compensation information. The first compensation information may be information received from a server or previously stored in the memory 220 of the electronic device 200. For example, the first compensation information may be a compensation function calculated using the first electronic device and the first display device. Specifically, the first compensation information may be a compensation function calculated to convert an RGB image obtained by image capturing the first display device by the first electronic device into an XYZ image obtained by the measuring device for the image output from the first display device, based on the XYZ image.

The processor 210 may generate second compensation information by correcting the first compensation information based on the response characteristics of the camera 240 and the compensated image. For example, the first compensation information may be a compensation function for converting the RGB image obtained by image capturing the first display device by the first electronic device into the XYZ obtained by the measuring device. The sensor of the camera included in the first electronic device may differ from the sensor of the camera 240, and the first display device and the display device may have different lighting characteristics. Thus, although the RGB image obtained through the camera 240 is converted into the XYZ image using the compensation function included in the first compensation information, an error may occur from the XYZ image obtained by the measuring device. To get rid of such error, the electronic device 101 may correct the compensation function included in the first compensation information and generate the second compensation information. In other words, since the second compensation information may be a compensation function calculated based on the lighting characteristics of the display device and the response characteristics of the camera 240 included in the electronic device 101, the second compensation information may differ from electronic device to electronic device.

The processor 210 may compensate for at least a partial area of the display device using the second compensation information. The second compensation information may be a compensation function calculated based on the lighting characteristics of the display device and the response characteristics of the camera 240 included in the electronic device 101. Thus, the measurement performance may be supplemented using the camera included in the electronic device 101.

The processor 210 may receive, from the display device, a control signal for controlling the optical information output from the display device. The control signal may include a signal including information for the luminance, color, uniformity of luminance or color, grayscale, gamma, and color space of the optical information output from the display device.

The processor 210 may generate an adjustment signal for adjusting the control signal based on an image including at least a partial area of the display device, and the second compensation information. The processor 210 may transmit the adjustment signal to the display device. The processor 210 may generate the adjustment signal based on information for adjusting the image quality value measured based on a reference image quality value, set by the user, to a reference value. For example, the processor 210 may calculate a value into which the current optical information needs to be changed so as to change the image quality value measured from the compensated XYZ image based on the second compensation information into the reference value and may calculate a value in which the display device needs to control the output so as to allow the display device to output the optical information to be changed. The processor 210 may generate an adjustment signal indicating how much the optical control signal needs to be changed. For example, the processor 210 may generate an adjustment signal only when the difference between the measured image quality value and the reference value is greater than or equal to a predetermined threshold.

The processor 210 may transmit the adjustment signal to the display device.

Upon identifying that camera sensor information of the electronic device 200 differs from camera sensor information of the first compensation information, the processor 210 may generate third compensation information for compensating for an image including a first grayscale area (e.g., a low grayscale) and compensate for an image for at least a partial area using the third compensation information. The processor 210 may identify that the camera sensor information of the electronic device 200 differs from the camera sensor information of the first compensation information based on comparison between the camera sensor information (e.g., sensor type and/or sensor value) of the electronic device 200 and the camera sensor information (e.g., sensor type and/or sensor value) of the first compensation information received from an external server. The camera sensor information of the first compensation information may represent the camera sensor information (e.g., sensor type and/or sensor value) of the first electronic device which is an electronic device different from, but of the same model as the electronic device 200 used for calculation of the first compensation information. When the camera lens information of the electronic device 200 differs from the camera lens information of the first compensation information, and if an image including a first grayscale area (e.g., a low grayscale area) corresponding to a dark color level among grayscale areas obtained through the camera 240 of the electronic device 200 is compensated by the first compensation information, the compensated image may be output disproportional to the linear first compensation information. When the camera lens information of the electronic device differs from the camera lens information of the first compensation information, the processor 210 may generate the third compensation information having a specific value so as to allow the image including the first grayscale area (e.g., a low grayscale area) to be linearly output. For example, the processor 210 may calculate and generate third compensation information that may make the sensor value of the electronic device identical to the sensor value of the first compensation information based on the camera sensor information of the electronic device and the camera sensor information of the first compensation information received from the external server. As another example, the processor 210 may detect, from the memory, the pre-stored third compensation information based on the camera sensor information of the electronic device and the camera sensor information of the first compensation information received from the external server. If the RGB image including at least a partial area of the display device includes the first grayscale area (e.g., a low grayscale) based on the coordinate information corresponding to the display device, the processor 210 may compensate for the obtained image by converting into the XYZ image using the compensation function included in the third compensation information.

Upon identifying that the camera setting information of the electronic device differs from the camera setting information of the first compensation information, the processor 210 may generate fourth compensation information for compensating for the image including the first grayscale area (e.g., a low grayscale), generate fifth compensation information for compensating for the image including the third grayscale area (e.g., a high grayscale), and compensate for the image for at least a partial area of the display device using the fourth compensation information or the fifth compensation information.

The processor 210 may receive the coordinate information, first compensation information, and first adjustment information corresponding to the display device 103 from the external server. The first compensation information may be a compensation function for converting the RGB image obtained by image capturing the first display device of the same model as the display device 103 by the first electronic device of the same model as the electronic device 101 into the XYZ image obtained by image capturing the first display device by the measuring device. The first compensation information may represent a value measured for compensating for the image including the second grayscale area (e.g., a mid grayscale area) corresponding to the mid color level among the grayscale areas. The first compensation information may be used to generate the fifth compensation information for compensating for the image including the third grayscale area corresponding to a bright color level among the grayscale areas. The first adjustment information may represent a value measured that may be used to generate the fourth compensation information for compensating for the image including the first grayscale area (e.g., a low grayscale) corresponding to a dark color level among the grayscale areas. The processor 210 may identify that the camera setting information of the electronic device 101 differs from the camera setting information of the first compensation information based on comparison between the camera setting information (e.g., exposure, sensor sensitivity, and/or aperture value of the camera) of the electronic device 101 and the camera setting information (e.g., exposure, sensor sensitivity, and/or aperture value of the camera) of the first compensation information received from an external server. The camera setting information of the first compensation information may represent the camera setting information (e.g., exposure, sensor sensitivity, and/or aperture value of the camera) of the first electronic device which is an electronic device different from, but of the same model as, the electronic device 101 used for calculation of the first compensation information. If the camera setting information of the electronic device is first camera setting information for the first grayscale area, the processor 210 may generate the fourth compensation information by multiplying the first adjustment information by the camera exposure value set in the electronic device and, if the RGB image including at least a partial area of the display device obtained through the camera 240 based on the coordinate information corresponding to the display device includes the first grayscale area, compensate for the obtained image by converting into the XYZ image using the compensation function included in the fourth compensation information. If the camera setting information of the electronic device is first camera setting information for the third grayscale area, the processor 210 may generate the fifth compensation information by dividing the first compensation information by the camera exposure value set in the electronic device and, if the RGB image including at least a partial area of the display device 103 obtained through the camera 240 based on the coordinate information corresponding to the display device includes the third grayscale area, compensate for the obtained image by converting into the XYZ image using the compensation function included in the fifth compensation information.

The processor 210 may output information for recommending to perform re-compensation for the display device according to a change in the display device.

Upon receiving information indicating a change in the physical property (e.g., a long-term or short-term change in physical property to the optical panel by heat) of the display device from an external electronic device (e.g., an external server), the processor 210 may output information for recommending to perform re-compensation for the display device. The external electronic device may predict and store a change, over time, in physical property corresponding to the usage time of the display device, after the display device is first compensated based on the compensation information. If the change in the physical property of the display device is determined as being greater than or equal to a reference change value, the external electronic device may transmit, to the electronic device, information indicating the change in the physical property of the display device.

Upon receiving information indicating a change in the physical property (e.g., a long-term or short-term change in physical property to the optical panel by heat) of the display device from the display device, the processor 210 may output information for recommending to perform re-compensation for the display device. The display device may predict and store a change, over time, in physical property corresponding to the usage time of the display device, after the display device is first compensated based on the compensation information. If the change in the physical property of the display device is determined as being greater than or equal to a reference change value, the display device may transmit, to the electronic device, information indicating the change in the physical property of the display device. Alternatively or additionally, if the change in the physical property of the display device is determined as being less than the reference change value, the display device may not transmit the information about the change in the physical property of the display device to the electronic device.

Upon receiving information indicating a change in the physical property of the display device from an application for compensating for the display device, installed on the electronic device, the processor 210 may output information for recommending to perform re-compensation for the display device. The application for compensating for the display device may predict and store a change, over time, in physical property corresponding to the usage time of the display device, after the display device is first compensated based on the compensation information. If the change in the physical property of the display device is determined as being greater than or equal to a reference change value, the application for compensating for the display device may transmit, to the processor, information indicating the change in the physical property of the display device.

The processor 210 may detect the coordinate information corresponding to the display device and the compensation information (e.g., the first compensation information, the second compensation information, the third compensation information, the fourth compensation information, and/or the fifth compensation information) stored in the memory 220 and convert the RGB image including at least a partial area of the display device obtained through the camera 240 into the XYZ image using the compensation function included in the compensation information, based on the coordinate information corresponding to the display device, thereby compensating for the obtained image.

The processor 210 may execute the compensation application and display a plurality of image compensation modes. As the compensation application is executed, the processor 210 may provide a plurality of image compensation modes including a first image compensation mode, a second image compensation mode, and a third image compensation mode for image compensation of the display device, which may be selected by the user.

The processor 210 may switch into the first image compensation mode for performing a first image compensation operation based on selection of the first image compensation mode (e.g., Quick mode 1501 of FIG. 15) among the plurality of image compensation modes. The processor 210 may perform the first image compensation operation to compensate for the image of the display device as the image quality adjustment item included in the first image compensation method during a first image compensation time in the first image compensation mode for performing the first image compensation operation. For example, in the first image compensation mode, the first image compensation time is set to, e.g., 30 seconds, and the first image compensation method includes, e.g., 2-point white balance as the image quality adjustment item, and the processor 210 may divide the grayscales into two levels from signal level 0 black to 255 full white for 30 seconds and compensate for the image of the display device while correcting the 2-point white balance which indicates the two levels.

The processor 210 may switch into the second image compensation mode for performing a second image compensation operation based on selection of the second image compensation mode (e.g., Basic mode 1503 of FIG. 15) among the plurality of image compensation modes. The processor 210 may perform the second image compensation operation to compensate for the image of the display device as the image quality adjustment item included in the second image compensation method during a second image compensation time in the second image compensation mode for performing the second image compensation operation. For example, in the second image compensation mode, the second image compensation time is set to, e.g., 180 seconds, and the second image compensation method includes, e.g., 2-point white balance, 20-point white balance, grayscale linearity, and gamma, as image quality adjustment items, and the processor 210 may divide the grayscales into two levels from signal level 0 black to 255 full white, correct the white balance for each of the two points representing the two levels, divides the grayscales into 20 levels from signal level 0 black to 255 full white, correct the white balance for each of the 20 points representing the 20 levels, correct the 20 points to be distinguished for grayscale for grayscale linearity, and correct gamma, thereby compensating for the image of the display device.

The processor 210 may switch into the third image compensation mode for performing a third image compensation operation based on selection of the third image compensation mode (e.g., Professional mode 1505 of FIG. 15) among the plurality of image compensation modes. The processor 210 may perform the third image compensation operation to compensate for the image of the display device as the image quality adjustment component included in the third image compensation method during a third image compensation time in the third image compensation mode for performing the third image compensation operation. For example, in the third image compensation mode, the third image compensation time is set to, e.g., 15 minutes, and the third image compensation method includes, e.g., 2-point white balance, 20-point white balance, grayscale linearity, gamma, chromaticity, and electro-optic transfer function (EOTF) of high dynamic range (HDR) signal, as image quality adjustment components, the processor 210 may divide the grayscales into two levels from signal level 0 black to 255 full white, correct the white balance for each of the two points representing the two levels, divides the grayscales into 20 levels from signal level 0 black to 255 full white, correct the white balance for each of the 20 points representing the 20 levels, correct the 20 points to be distinguished for grayscale for grayscale linearity, correct gamma, correct chromaticity, and correct the EOTF of HDR signal, thereby compensating for the image of the display device.

Figure 15:
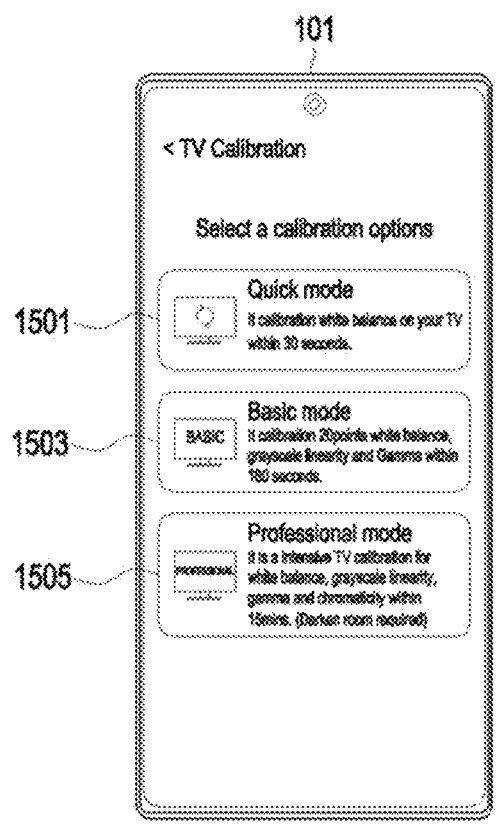
FIG. 15 is a view illustrating a plurality of image compensation modes for image compensation on a display device by an electronic device according to various embodiments.

The processor 210 may provide an additional configuration menu screen for image quality adjustment components based on selection of the third image compensation mode (e.g., Professional mode 1505 of FIG. 15). If a luminance is selected by the user from among the image quality adjustment components such as luminance, gamma, and pattern size included in the configuration menu screen, the processor 210 may control the display device to display in the luminance selected by the user while compensating for the image of the display device. The processor 210 may control the display device to provide a gamma interface to allow the user to select a type of gamma curve, rather than performing correction for fitting the gamma curve fixed according to a broadcast standard or other standards, as in the second image compensation mode (e.g., Basic mode 1503 of FIG. 15). The processor 210 may control the display device to provide a pattern size interface to allow the user to select a specific pattern size, rather than using a full raster pattern which is a full display pattern, as in the second image compensation mode (e.g., Basic mode). The processor 210 may provide an additional interface for controlling the settings of the camera 240 of the electronic device which is capable of image capturing the image quality measurement pattern output from the display device and an interface for adjusting the HDR signal on the configuration menu screen.

The memory 220 may store various data used by at least one component (e.g., the processor 210) of the electronic device 200. The various data may include, for example, software and input data or output data for a command related thereto. The memory 220 may include a volatile memory or a non-volatile memory. For example, the memory 220 may include at least one type of storage medium among a flash memory type, a hard disk type, a multimedia card micro type, a card type memory (e.g., secure digital (SD) or extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The memory 220 may store one or more instructions executable by the processor 210. For example, one or more instructions stored in the memory 220 may be instructions for compensating for an obtained image. One or more instructions stored in the memory 220 may be instructions for measuring the image quality value of the compensated image. One or more instructions stored in the memory 220 may be instructions for generating adjustment information necessary to convert the measured image quality value into the reference value.

The memory 220 may store images obtained using the camera 240.

Compensation information for compensating for images may be stored in the memory 220. The memory 220 may store information obtained by matching per-model lighting characteristics of the display device and per-model camera response characteristics of the electronic device. The memory 220 may store compensation information for compensating for the per-model camera response characteristics of electronic devices, which have been matched according to the per-model lighting characteristics of display devices. The compensation information stored in the memory 220 may be a compensation function that may be used to compensate for, e.g., luminance, color, and distribution, using the image obtained by the processor 210 or may be a value pre-obtained for each display or for each user terminal.

The communication circuit 230 may establish a direct (e.g., wired) communication channel or a wireless communication channel between the electronic device 200 and the display device or a server or support communication through the established communication channel. The communication circuit 230 may include one or more communication processors that are operable independently from the processor 210 (e.g., the application processor (AP)) and supports a direct (e.g., wired) communication or a wireless communication. According to an embodiment, the communication circuit 230 may include a wireless communication module (e.g., a cellular communication module, a short-range wireless communication module, or a global navigation satellite system (GNSS) communication module) or a wired communication module (e.g., a local area network (LAN) communication module or a power line communication (PLC) module). A corresponding one of these communication modules may communicate with the external electronic device via a first network (e.g., a short-range communication network, such as Bluetooth™, wireless-fidelity (Wi-Fi) direct, or infrared data association (IrDA)) or a second network (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module may identify or authenticate the electronic device 200 in a communication network, such as the first network or the second network, using subscriber information (e.g., international mobile subscriber identity (IMSI)) stored in the subscriber identification module.

The wireless communication module may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module may support a high-frequency band (e.g., the mmWave band) to achieve, e.g., a high data transmission rate. The wireless communication module may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module may support various requirements specified in the electronic device 200, an external electronic device (e.g., the display device 130), or a network system (e.g., the second network). According to an embodiment, the wireless communication module may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The communication circuit 230 may communicate with the display device through a wired/wireless network. For example, the communication circuit 230 may perform communication with the display device to adjust the optical information output of the display. Specifically, the communication circuit 230 may transmit/receive data to and from the display device connected through a wired/wireless network under the control of the processor 210. According to an embodiment, the communication circuit 230 may receive display identification information and an output control signal from the display device, and transmit an adjustment signal for adjusting the output control signal to the display device.

The camera 240 may include one or more lenses, image sensors, image signal processors, or flashes. The camera 240 may generate an image by image capturing a still image and a video, and may signal-process the image. The camera 240 may obtain one image by image capturing the entire display device. The camera 240 may form an image on an image sensor, such as a charge-coupled device (CCD) or complementary metal-oxide-semiconductor (CMOS), using the information for the subject, and the image sensor may convert the light received through the camera into an electrical signal. Further, the camera 240 may perform one or more signal processing operations among auto exposure (AE), auto white balance (AWB), color recovery, correction, sharpening, gamma, and lens shading correction, on the captured image. The response characteristics of recognizing optical information may differ depending on the sensor and/or lens included in the camera 240.

Figure 3:
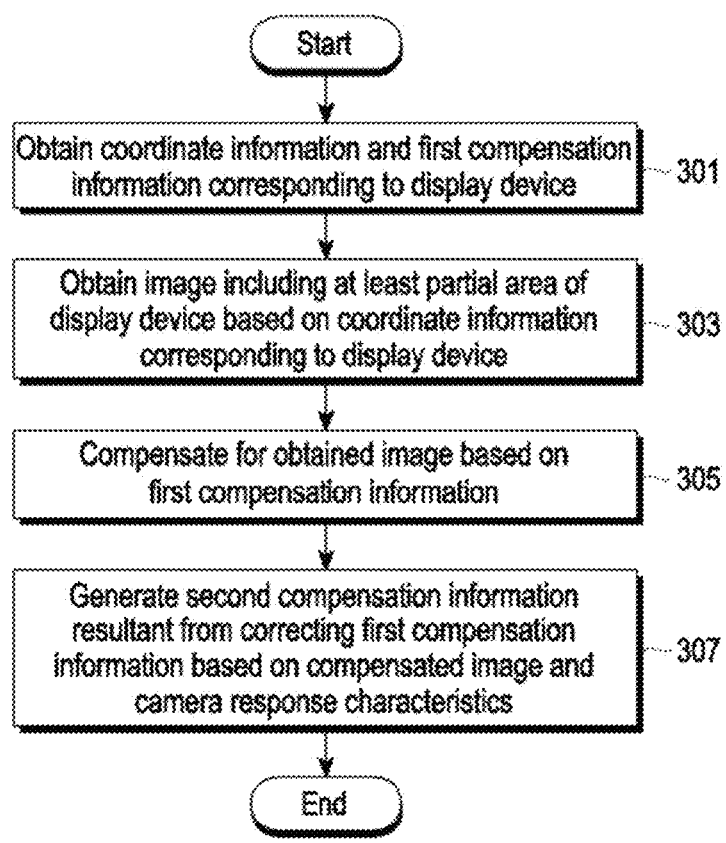
FIG. 3 is a flowchart illustrating a method of operation of an electronic device according to various embodiments.
Figure 4A:
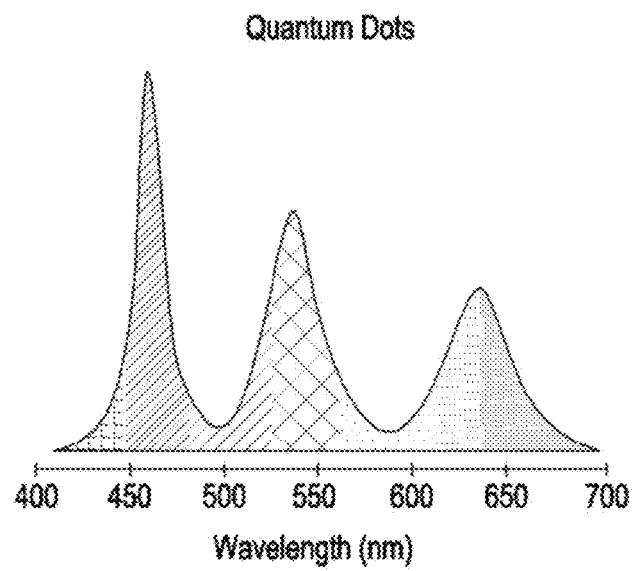
FIG. 4A is a view illustrating optical information output from a display device according to various embodiments.
Figure 4B:
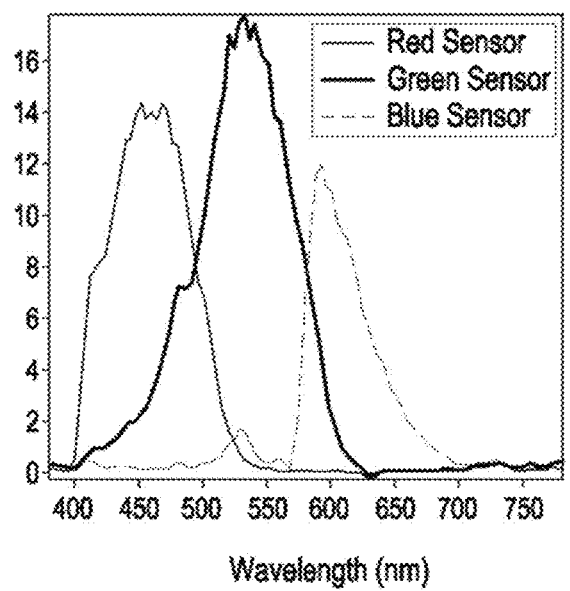
FIG. 4B is a view illustrating RGB response spectra of an image obtained by an electronic device according to various embodiments.
Figure 4C:
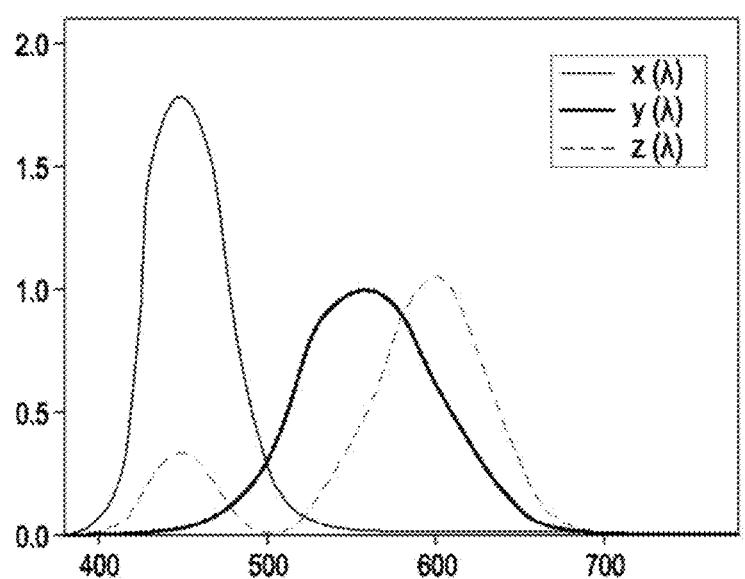
FIG. 4C is a view illustrating XYZ response spectra of an image obtained by a measuring device according to various embodiments.
Figure 5:
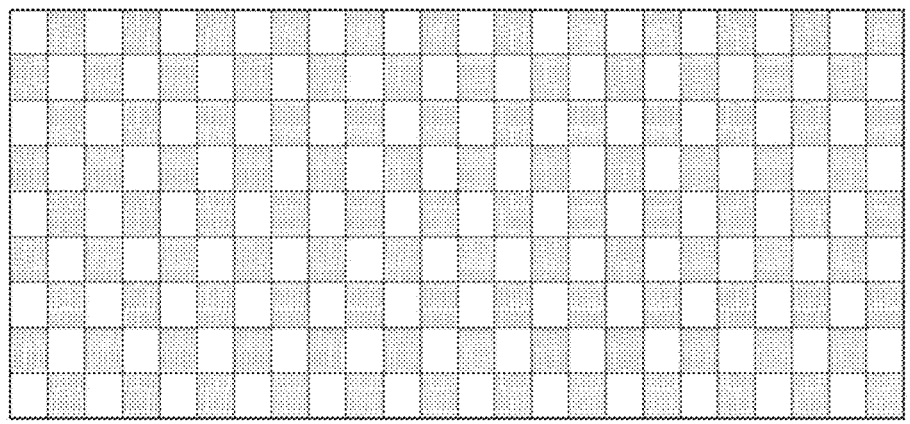
FIG. 5 is a view illustrating an image quality measurement pattern output from a display device according to various embodiments.
Figure 5:
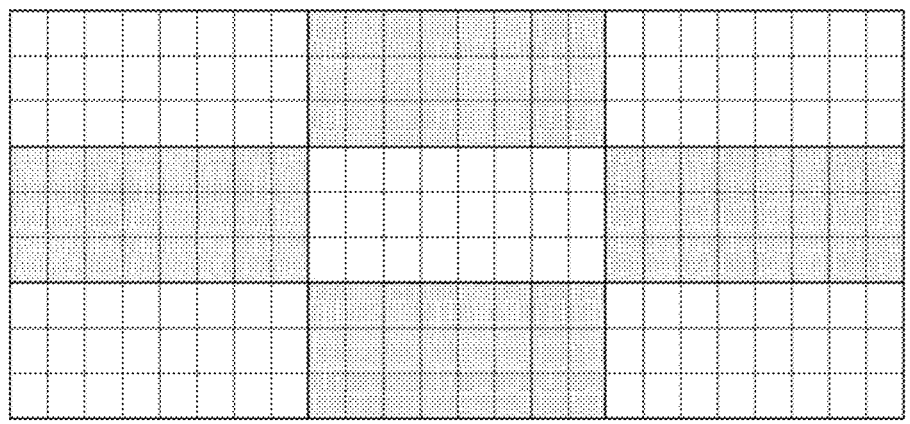
Figure 5:
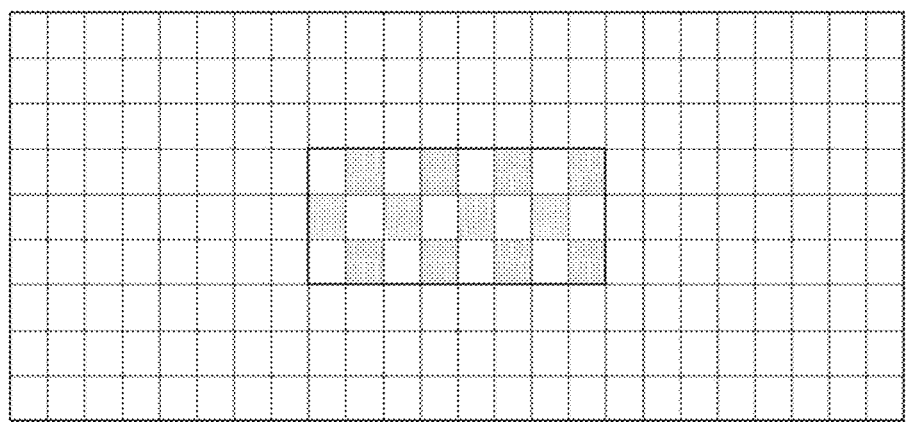
Figure 6:
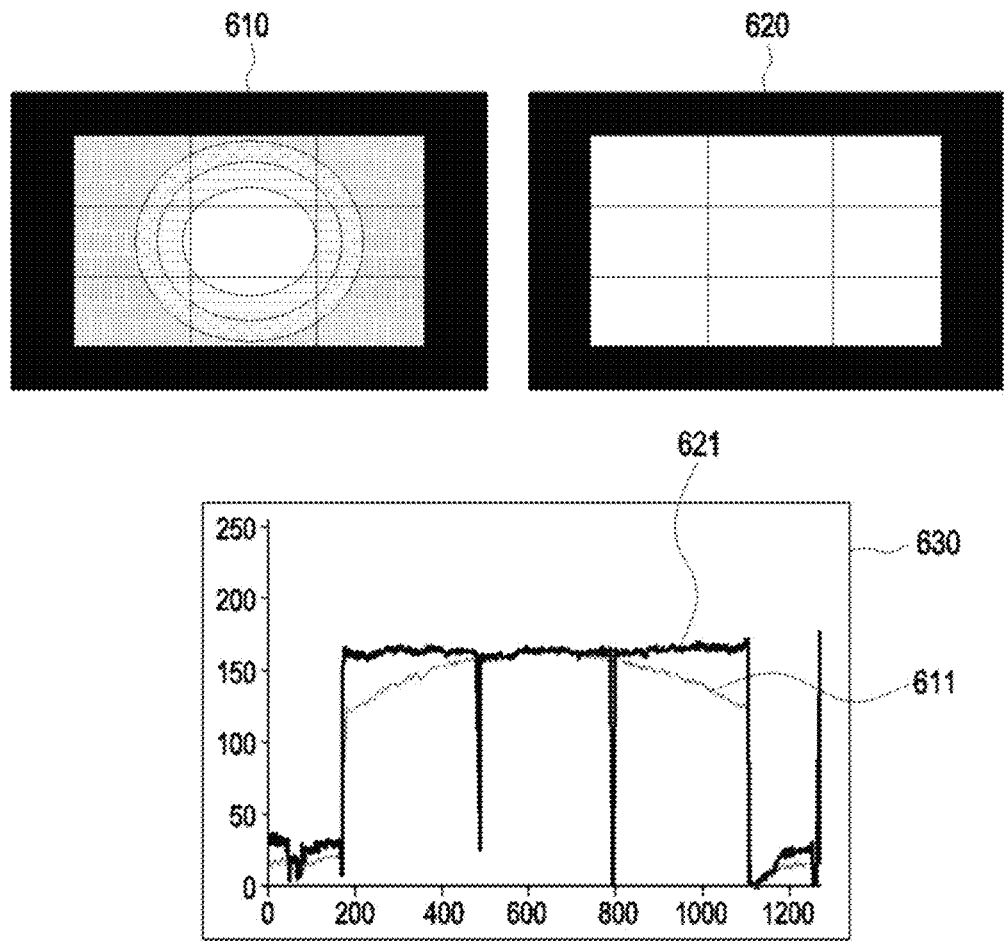
FIG. 6 is a view illustrating an example of performing image compensation by an electronic device according to various embodiments.

FIG. 3 is a flowchart illustrating a method of operation of an electronic device according to various embodiments. The embodiment of FIG. 3 is described in more detail with reference to the embodiment of FIGS. 4A, 4B, 4C, 5 and 6. FIG. 4A is a view illustrating optical information output from a display device according to various embodiments. FIG. 4B is a view illustrating RGB response spectra of an image obtained by an electronic device according to various embodiments. FIG. 4C is a view illustrating XYZ response spectra of an image obtained by a measuring device according to various embodiments. FIG. 5 is a view illustrating an image quality measurement pattern output from a display device according to various embodiments. FIG. 6 is a view illustrating an example of performing image compensation by an electronic device according to various embodiments.

The operations of FIG. 3 is not limited to the presented order, and other operation(s) may be included between the operations. Also, at least some of the operations of FIG. 3 may be omitted. In the disclosure, when the electronic device 101 performs a specific operation, the processor 210 of the electronic device 101 may perform the specific operation, or the processor 210 may control other hardware to perform the specific operation. In the disclosure, when the electronic device 101 performs a specific operation, instructions stored in the memory 220 may be executed by the processor 210 or other hardware to perform the specific operation, and instructions that trigger the specific operation may be stored in the memory 220.

According to various embodiments, the electronic device 101 (or the electronic device 210) may obtain coordinate information and first compensation information corresponding to the display device 103 in operation 301. The electronic device 101 may receive coordinate information and first compensation information corresponding to the display device 103 from an external server, or may use information previously stored in the memory of the electronic device 101. The coordinate information corresponding to the display device 103 may be information indicating a point measured to perform compensation when the display device 103 is produced. For example, the coordinate information may be a single white point or R/G/B/W/points measured to perform compensation. Accordingly, compensation for the display device may be performed by measuring only a specific point. The first compensation information corresponding to the display device 103 may differ depending on the model of the electronic device 101 and the model of the display device 103. For example, the first compensation information may be a compensation function for converting the RGB image obtained by image capturing the first display device of the same model as the display device 103 by the first electronic device of the same model as the electronic device 101 into the XYZ image obtained by image capturing the first display device by the measuring device. For example, FIG. 4A illustrates a spectrum output of a screen output by the first display device of the same model as the display device 103. FIG. 4B illustrates the spectra of an RGB image obtained by image capturing a screen output by the first display device using the camera of the first electronic device. FIG. 4C illustrates the spectra of an XYZ image obtained by a measuring device, for a screen output by the first display device. Here, a compensation function for converting the RGB image obtained by image capturing with the camera of the first electronic device into the XYZ image obtained by the measuring device may be calculated. The first compensation information may include the calculated compensation function.

According to various embodiments, in operation 303, the electronic device 101 may obtain an image including at least a partial area of the display device 103 based on the coordinate information corresponding to the display device 103. While the electronic device 101 captures the image including at least a partial area of the display device 103, the display device 103 may display an image quality measurement pattern. For example, referring to FIG. 5, the display device 103 may output various image quality measurement patterns 510, 520, and 530. The image quality measurement patterns 510, 520, and 530 illustrated in FIG. 5 are only some examples, and there may be other various image quality measurement patterns.

A component to be adjusted by the electronic device 103 may vary according to the image quality measurement pattern output by the display device 103. For example, when the electronic device 101 measures luminance among the optical information output from the display device 103, the display device 103 may output a bright white pattern. In another example, the electronic device 101 may request the display device 103 to output a specific image quality measurement pattern to measure the image quality of a specific adjustment component. The display device 103 may output an R/G/B/Y/M/C screen if the adjustment component requested by the user is color among the optical information. If the adjustment component requested by the user is gamma, the display device 103 may output image quality measurement patterns having various grayscales from a dark black to bright white level while sequentially changing them at predetermined or specific time intervals.

According to various embodiments, the electronic device 101 may compensate for the obtained image based on the first compensation information in operation 305. The electronic device 101 may compensate for the obtained image by converting the RGB image including at least a partial area of the display device 103 into the XYZ image using the compensation function included in the first compensation information. For example, the compensation function included in the first compensation information may be a function calculated based on the lighting characteristics of the first display device of the same model as the display device 103 and the response characteristics of the camera included in the first electronic device of the same model as the electronic device 101.

According to various embodiments, the electronic device 101 may generate second compensation information by correcting the first compensation information, based on the compensated image and the response characteristics of the camera in operation 307. Although the electronic device 101 and the first electronic device may be of the same model, the optical information recognized by the sensor of the camera included in the electronic device 101 and the optical information recognized by the sensor of the camera included in the first electronic device may differ from each other. Further, even if the display device 103 and the first display device are of the same model, the lighting characteristics of the panel included in the display device 103 may differ from the lighting characteristics of the panel included in the first display device. Thus, the first compensation information may need to be corrected according to the camera response characteristics of the electronic device 101 and the lighting characteristics of the display device 103. The electronic device 101 may convert the RGB image obtained by image capturing the display device 103 into the XYZ image using the compensation function included in the first compensation information. In this case, the compensation function included in the first compensation information may be corrected to allow the converted XYZ image to correspond to the XYZ image obtained by measuring the first display device by the measuring device. In other words, a corrected compensation function may be generated to convert the RGB image obtained by image capturing the display device 103 by the electronic device 101 into the XYZ image measured by the measuring device. The electronic device 101 may compensate for the RGB image, obtained by image capturing, using the corrected compensation function. For example, the left-hand image 610 of FIG. 6 shows a captured image, and the right-hand image 620 shows an image obtained after performing compensation using the corrected compensation function by the electronic device 101. The electronic device 101 may apply the image (e.g., the left-hand image 610 or the right-hand image 620) selected by the user, as the image quality image of the display device while displaying the left-hand image 610 representing the captured image and the right-hand image 620 resultant from compensating for the captured image. For example, the image obtained by capturing an image of the display device 103 by the electronic device 101 may be converted into a measurement information image which is represented in luminance and color coordinates through a compensation algorithm. The compensation algorithm performed by the electronic device 101 may be include one or more functions of luminance information compensation, color information compensation, gamma characteristic compensation, and distribution information compensation.

The luminance information compensation function is a function for compensating for the amount of light output from the display device 103 and reaching the sensor inside the camera of the electronic device 101 and response characteristics of the sensor of the camera.

The color information compensation function is a function for compensating for the characteristics in which the red, green, and blue pixel values in the sensor of the camera of the electronic device 101 respond to the color output from the display device 103.

The distribution information compensation function is a function for compensating for non-uniformity of brightness distribution in image due to vignetting of the camera lens of the electronic device 101 and viewing angle characteristics of the display device 103. When the display device 103 with a large-scale light source is recognized, the camera of the electronic device 101 may particularly recognize the light from a portion closest and orthogonal to the display device 103 and may perceive the light from a portion farther or inclined therefrom as dark or different from the original color. As such, the image captured by the electronic device 101 is brighter at the center and darker at the periphery as shown in the left-hand image 610. Thus, the electronic device 101 may compensate for the luminance non-uniformity using a distribution information compensation function. If the electronic device 101 performs distribution information compensation, the left-hand image 610 may be compensated to have a uniform luminance without difference between the inside of the image and out, as the right-hand image 620.

The graph 630 of FIG. 6 represents the function of uniformity in luminance of the left-hand image 610 and the right-hand image 620. It can be seen from the graph 630 that the luminance 611 of the left-hand image is significantly different between the center and the periphery. According to an embodiment, it may be shown from the graph 630 that, as a result of compensation for the distribution information for the left-hand image 610 by the electronic device 101, the luminance 621 of the right-hand image is more stable and constant irrespective of the areas of the image.

Figure 7:
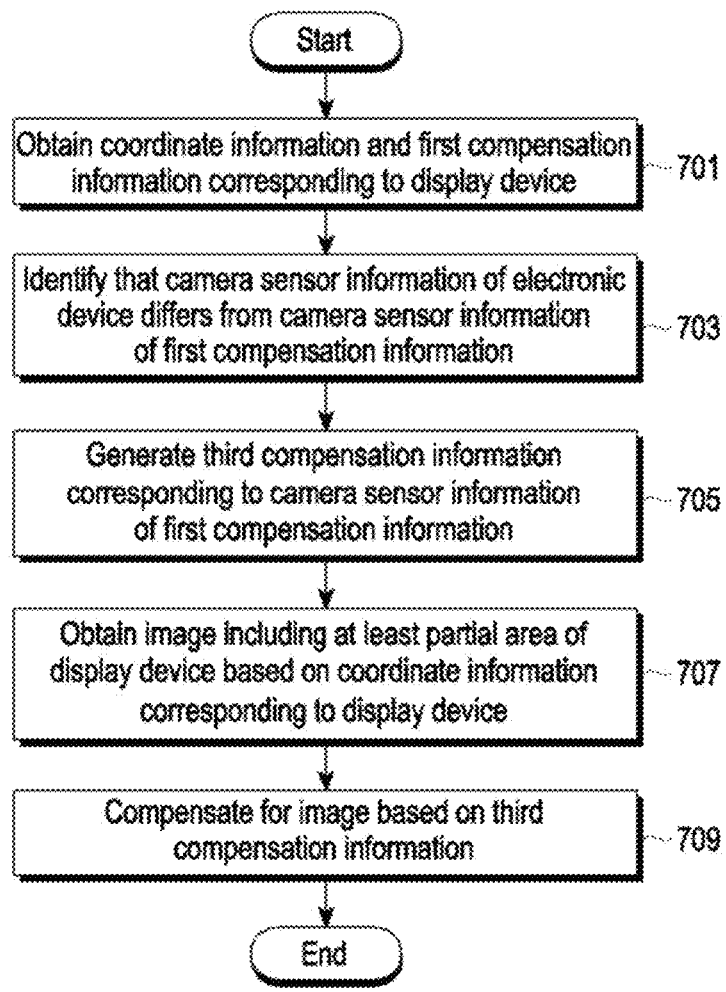
FIG. 7 is a flowchart illustrating a method of operation of an electronic device according to various embodiments.
Figure 8A:
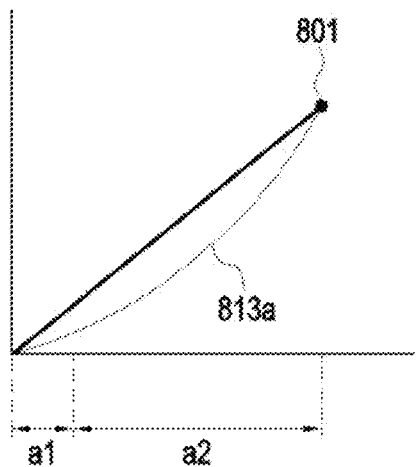
FIGS. 8A and 8B are views illustrating an operation of additionally generating compensation information by an electronic device according to various embodiments.
Figure 8B:
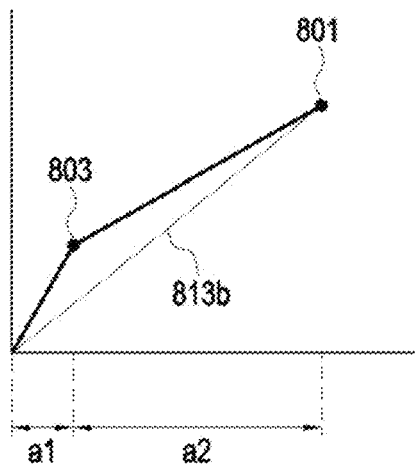

FIG. 7 is a flowchart illustrating a method of operation of an electronic device according to various embodiments. FIGS. 8A and 8B describe the method of operation of the electronic device in greater detail with reference to FIG. 7. FIGS. 8A and 8B are views illustrating an operation of additionally generating compensation information by an electronic device according to various embodiments.

The operations of FIG. 7 is not limited to the presented order, and other operation(s) may intervene between the operations. Further, at least some of the operations of FIG. 7 may be omitted. In the disclosure, when the electronic device 101 performs a specific operation, the processor 210 of the electronic device 101 may perform the specific operation, or the processor 210 may control other hardware to perform the specific operation. In the disclosure, when the electronic device 101 performs a specific operation, instructions stored in the memory 220 may be executed by the processor 210 or other hardware to perform the specific operation, and instructions that trigger the specific operation may be stored in the memory 220.

According to various embodiments, the electronic device 101 (e.g., the processor 210) may obtain coordinate information and first compensation information corresponding to the display device 103 in operation 701. The electronic device 101 may receive coordinate information and first compensation information corresponding to the display device 103 from an external server, or may use information previously stored in the memory. The coordinate information corresponding to the display device 103 may be information indicating a point measured to perform compensation when the display device 103 is produced. For example, the coordinate information may be a single white point or R/G/B/W/points measured to perform compensation. Accordingly, compensation for the display device may be performed by measuring only a specific point. The first compensation information corresponding to the display device 103 may differ depending on the model of the electronic device 101 and the model of the display device 103.

According to various embodiments, the electronic device 101 may identify that the camera sensor information of the electronic device 101 differs from the camera sensor information of the first compensation information in operation 703. The electronic device 101 may identify that the camera sensor information of the electronic device 101 differs from the camera sensor information of the first compensation information based on comparison between the camera sensor information (e.g., sensor type and/or sensor value) of the electronic device 101 and the camera sensor information (e.g., sensor type and/or sensor value) of the first compensation information received from an external server. The camera sensor information of the first compensation information may represent the camera sensor information (e.g., sensor type and/or sensor value) of the first electronic device which is an electronic device different from, but of the same model as, the electronic device 101 used for calculation of the first compensation information.

According to various embodiments, the electronic device 101 may generate third compensation information for compensating for the image including the first grayscale area in operation 705. When the camera lens information of the electronic device differs from the camera lens information of the first compensation information, if an image including a first grayscale area (e.g., a low grayscale area) corresponding to a dark color level among grayscale areas (e.g., a1 and a2 of FIG. 8A) obtained through the camera of the electronic device 101 is compensated by the first compensation information (e.g., 801 of FIG. 8A), a disproportional compensated image may be output to the linear first compensation information (813a). When the camera lens information of the electronic device differs from the camera lens information of the first compensation information, the electronic device 101 may generate the third compensation information (e.g., 803 of FIG. 8B) having a specific value so as to allow the image including the first grayscale area (e.g., a low grayscale area) to be linearly output (813b). The electronic device 101 may calculate and generate third compensation information that may make the sensor value of the electronic device identical to the sensor value of the first compensation information based on the camera sensor information of the electronic device and the camera sensor information of the first compensation information received from the external server. The electronic device 101 may detect, from the memory, the pre-stored third compensation information based on the camera sensor information of the electronic device and the camera sensor information of the first compensation information received from the external server.

According to various embodiments, in operation 707, the electronic device 101 may obtain an image including at least a partial area of the display device 103 based on the coordinate information corresponding to the display device 103. While the electronic device 101 captures the image including at least a partial area of the display device 103, the display device 103 may display an image quality measurement pattern.

According to various embodiments, the electronic device 101 may compensate for the obtained image based on the third compensation information in operation 709. If the RGB image including at least a partial area of the display device 103 includes the first grayscale area (e.g., a1 of FIG. 10), the electronic device 101 may compensate for the obtained image by converting into the XYZ image using the compensation function included in the third compensation information.

Figure 9:
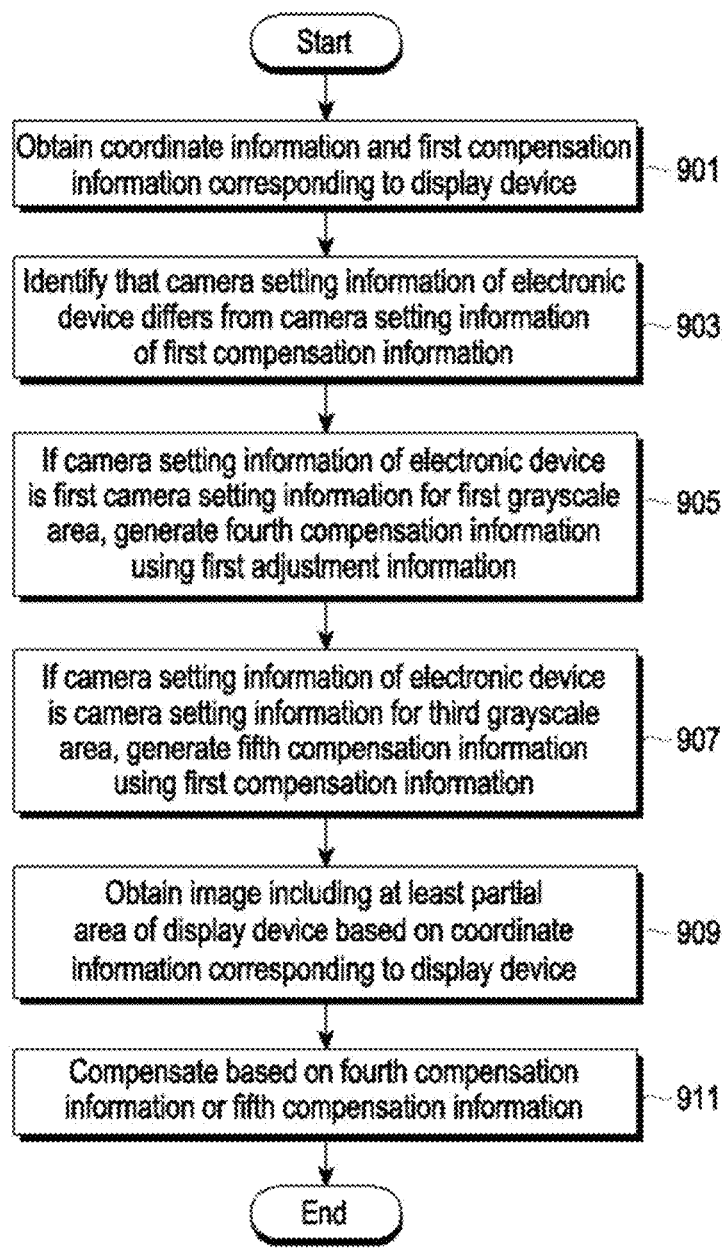
FIG. 9 is a flowchart illustrating a method of operation of an electronic device according to various embodiments.
Figure 10:
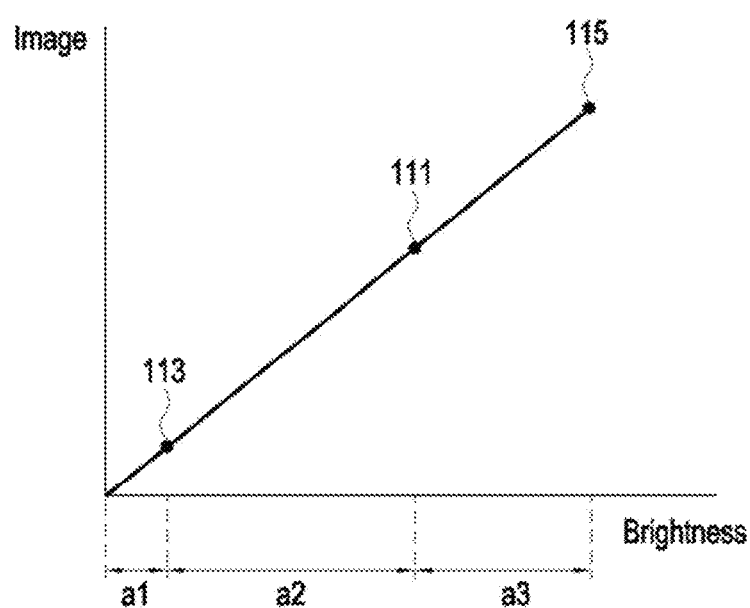
FIG. 10 is a view illustrating an operation of additionally generating compensation information by an electronic device according to various embodiments.

FIG. 9 is a flowchart illustrating a method of operation of an electronic device according to various embodiments. The embodiment of FIG. 9 is described in greater detail with reference to the embodiment of FIG. 10. FIG. 10 is a view illustrating an operation of additionally generating compensation information by an electronic device according to various embodiments.

The operations of FIG. 9 is not limited to the presented order, and other operation(s) may intervene between the operations. Further, at least some of the operations of FIG. 9 may be omitted. In the disclosure, when the electronic device 101 performs a specific operation, the processor 210 of the electronic device 101 may perform the specific operation, or the processor 210 may control other hardware to perform the specific operation. In the disclosure, when the electronic device 101 performs a specific operation, instructions stored in the memory 220 may be executed to enable the processor 210 or other hardware to perform the specific operation, and instructions that trigger the specific operation may be stored in the memory 220.

According to various embodiments, the electronic device 101 (e.g., the processor 210) may obtain coordinate information, first compensation information, and first adjustment information corresponding to the display device 103 in operation 901. The electronic device 101 may receive the coordinate information, first compensation information, and first adjustment information corresponding to the display device 103 from an external server, or may use information previously stored in the memory. The coordinate information corresponding to the display device 103 may be information indicating a point measured to perform compensation when the display device 103 is produced. For example, the coordinate information may be a single white point or R/G/B/W/points measured to perform compensation. Accordingly, compensation for the display device may be performed by measuring only a specific point. The first compensation information corresponding to the display device 103 may differ depending on the model of the electronic device 101 and the model of the display device 103. For example. The first compensation information may be a compensation function for converting the RGB image obtained by image capturing the first display device of the same model as the display device 103 by the first electronic device of the same model as the electronic device 101 into the XYZ image obtained by image capturing the first display device by the measuring device. The first compensation information may represent a value (e.g., 111 of FIG. 10) measured for compensating for the image including the second grayscale area (e.g., a mid grayscale area, e.g., a2 of FIG. 10) corresponding to the mid color level among the grayscale areas (e.g., a1, a2, and a3 of FIG. 10). The first compensation information may be used to generate fifth compensation information for compensating for the image including the third grayscale area (e.g., a low grayscale area, e.g., a3 of FIG. 10) corresponding to a bright color level among the grayscale areas (e.g., a1, a2, and a3 of FIG. 10). The first adjustment information may represent a measured value (e.g., 113 of FIG. 10) that may be used to generate fourth compensation information for compensating for the image including the first grayscale area (e.g., a low grayscale area, e.g., a1 of FIG. 10) corresponding to a dark color level among the grayscale areas (e.g., a1, a2, and a3 of FIG. 10).

According to various embodiments, the electronic device 101 may identify that the camera setting information of the electronic device 101 differs from the camera setting information of the first compensation information in operation 903. The electronic device 101 may identify that the camera setting information of the electronic device 101 differs from the camera setting information of the first compensation information based on comparison between the camera setting information (e.g., exposure, sensor sensitivity, and/or aperture value of the camera) of the electronic device 101 and the camera setting information (e.g., exposure, sensor sensitivity, and/or aperture value of the camera) of the first compensation information received from an external server. The camera setting information of the first compensation information may represent the camera setting information (e.g., exposure, sensor sensitivity, and/or aperture value of the camera) of the first electronic device which is an electronic device different from, but of the same model as, the electronic device 101 used for calculation of the first compensation information.

According to various embodiments, the electronic device 101 may generate fourth compensation information using the first adjustment information if the camera setting information of the electronic device is first camera setting information for the first grayscale area in operation 905. The electronic device 101 may generate the fourth compensation information for compensating for the image including the first grayscale area (e.g., a1 of FIG. 10) by multiplying the first adjustment information (e.g., 113 of FIG. 10) by the camera exposure value set in the electronic device.

According to various embodiments, in operation 907, the electronic device 101 may generate fifth compensation information using the first compensation information if the camera setting information of the electronic device is second camera setting information for the third grayscale area. The electronic device 101 may generate the fifth compensation information (e.g., 115 of FIG. 10) for compensating for the image including the third grayscale area (e.g., a3 of FIG. 10) by dividing the first compensation information (e.g., 111 of FIG. 10) by the camera exposure value set in the electronic device.

According to various embodiments, in operation 909, the electronic device 101 may obtain an image including at least a partial area of the display device 103 based on the coordinate information corresponding to the display device 103. While the electronic device 101 captures the image including at least a partial area of the display device 103, the display device 103 may display an image quality measurement pattern.

According to various embodiments, the electronic device 101 may compensate for the obtained image based on the fourth compensation information or the fifth compensation information in operation 911. If the RGB image including at least a partial area of the display device 103 includes the first grayscale area (e.g., a1 of FIG. 10), the electronic device 101 may compensate for the obtained image by converting into the XYZ image using the compensation function included in the fourth compensation information. If the RGB image including at least a partial area of the display device 103 includes the third grayscale area (e.g., a3 of FIG. 10), the electronic device 101 may compensate for the obtained image by converting into the XYZ image using the compensation function included in the fifth compensation information (e.g., 115 of FIG. 10).

Figure 11:
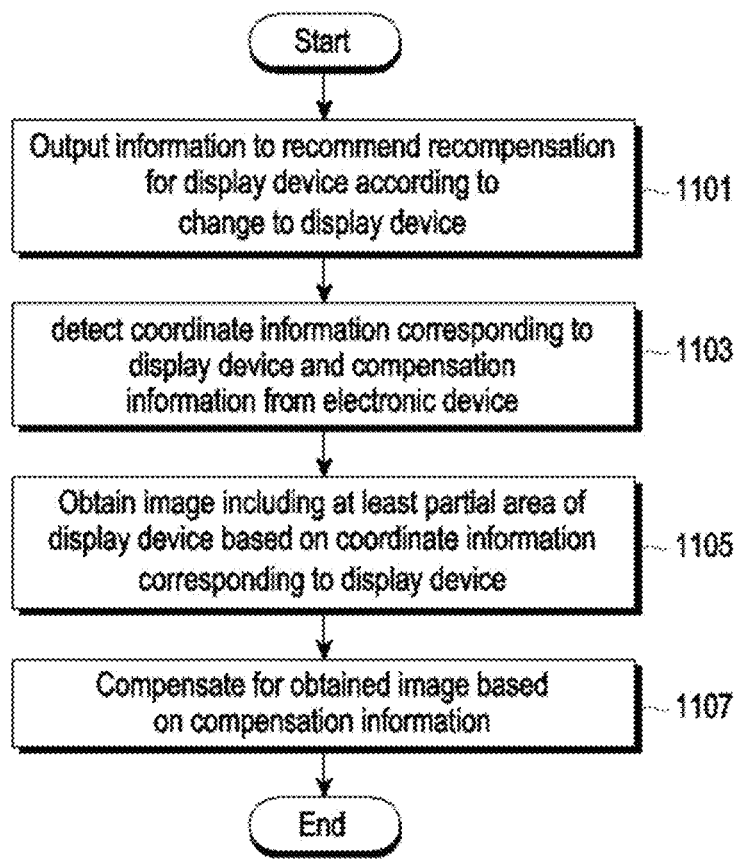
FIG. 11 is a flowchart illustrating a method of operation of an electronic device according to various embodiments.
Figure 12:
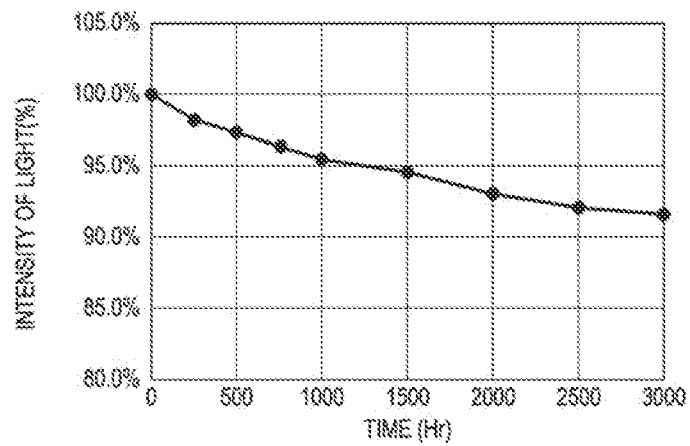
FIG. 12 is a view illustrating a physical property change to a display device according to various embodiments.
Figure 12:
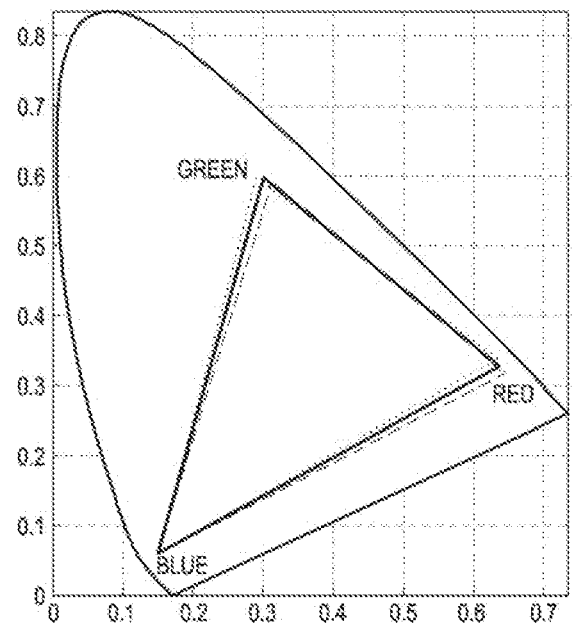

FIG. 11 is a flowchart illustrating a method of operation of an electronic device according to various embodiments. The embodiment of FIG. 12 is described in greater detail with reference to the embodiment of FIG. 12. FIG. 12 is a view illustrating a physical property change to a display device according to various embodiments.

The operations of FIG. 11 is not limited to the presented order, and other operation(s) may intervene between the operations. Further, at least some of the operations of FIG. 11 may be omitted. In the disclosure, when the electronic device 101 performs a specific operation, the processor 210 of the electronic device 101 may perform the specific operation, or the processor 210 may control other hardware to perform the specific operation. In the disclosure, when the electronic device 101 performs a specific operation, instructions stored in the memory 220 may be executed to enable the processor 210 or other hardware to perform the specific operation, and instructions that trigger the specific operation may be stored in the memory 220.

According to various embodiments, the electronic device 101 (e.g., the processor 210) may output information to recommend to perform recompensation for the display device according to a change to the display device in operation 1101. Upon receiving information indicating a change in the physical property (e.g., a long-term or short-term change in physical property to the optical panel by heat) of the display device from an external server, the electronic device may output information for recommending to perform recompensation for the display device. As shown in FIG. 12, the external server may predict and store a change, over time, in physical property corresponding to the usage time of the display device, after the display device is first compensated based on the compensation information. If the change in the physical property of the display device is determined as being greater than or equal to a reference change value, the external server may transmit, to the electronic device, information indicating the change in the physical property of the display device. For example, the external server may predict a change in intensity of light with respect to the usage time of the display device after the display device is first compensated based on the compensation information. Similarly, the change in RGB color of the display device may be predicted.

According to various embodiments, the electronic device 101 (e.g., the processor 210) may detect compensation information from the electronic device in operation 1103. The electronic device 101 may detect compensation information (e.g., first compensation information, second compensation information (e.g., 801 of FIG. 8B, and/or 111 of FIG. 10), third compensation information (e.g., 803 of FIG. 8B), fourth compensation information (e.g., 113 of FIG. 10), and/or fifth compensation information (e.g., 115 of FIG. 10)) and display coordinate information stored in the memory.

According to various embodiments, in operation 1105, the electronic device 101 may obtain an image including at least a partial area of the display device 103 based on the coordinate information corresponding to the display device 103. While the electronic device 101 captures the image including at least a partial area of the display device 103, the display device 103 may display an image quality measurement pattern.

According to various embodiments, the electronic device 101 may compensate for the obtained image based on the compensation information in operation 1107. The electronic device 101 may compensate for the obtained image by converting the RGB image including at least a partial area of the display device 103 into the XYZ image using the compensation function included in the compensation information.

FIGS. 13A to 13D are views illustrating a method for performing image compensation on a display device according to various embodiments.

Figure 13A:
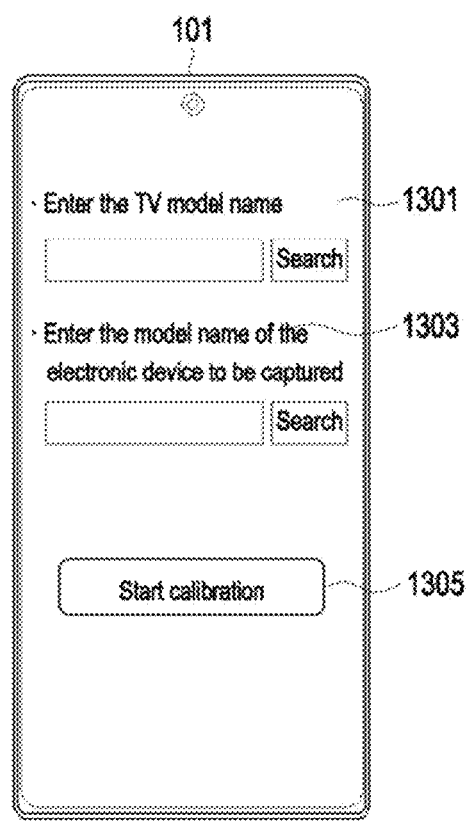
FIG. 13A is a view illustrating a method for performing image compensation on a display device according to various embodiments.

According to an embodiment, the electronic device 101 may execute a compensation application based on a user input. Referring to FIG. 13A, the electronic device 101 may display guide information, e.g., "Enter the TV model name" 1301 or "Enter the model name of the electronic device to be captured" 1303, thereby identifying the model name of the TV and the model name of the electronic device to be compensated. Alternatively, the electronic device 101 may identify the model name of the display device by receiving identification information of the display device from the display device 103.

Figure 13B:
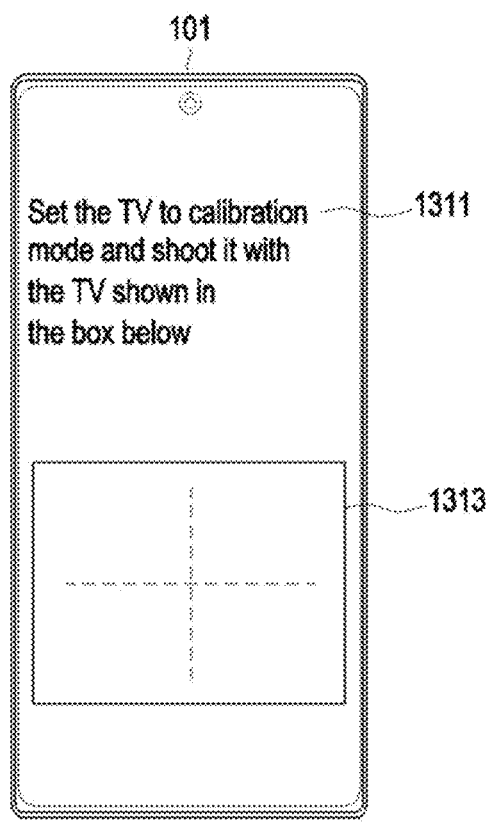
FIG. 13B is a view illustrating a method for performing image compensation on a display device according to various embodiments.
Figure 13C:
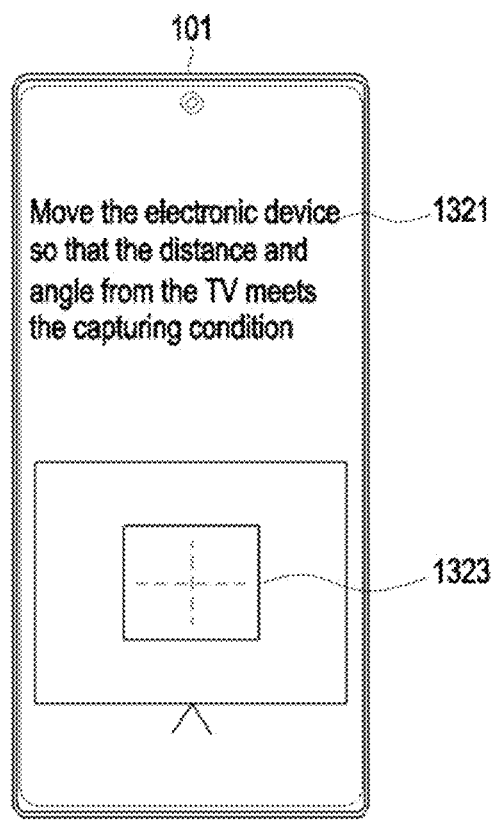
FIG. 13C is a view illustrating a method for performing image compensation on a display device according to various embodiments.
Figure 13D:
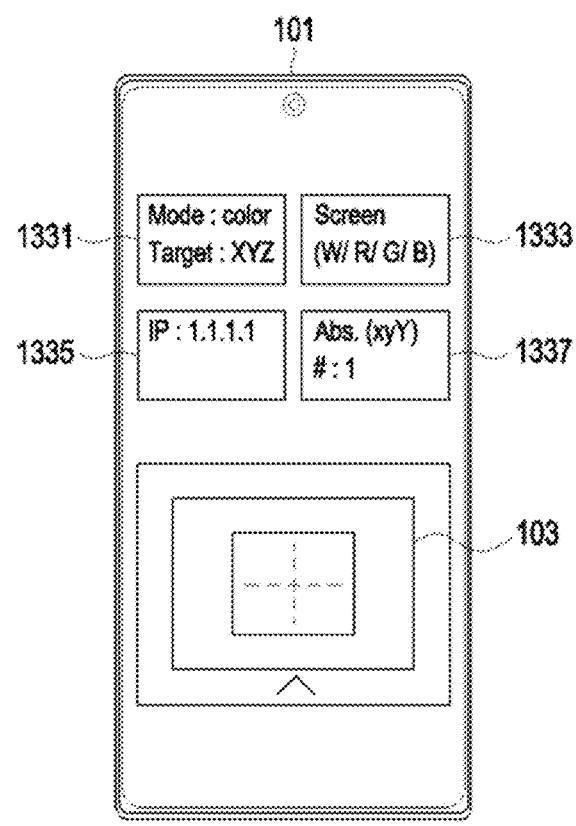
FIG. 13D is a view illustrating a method for performing image compensation on a display device according to various embodiments.

The electronic device 101 may allow the user to capture the display device 103 based on a user input of selecting "start calibration" 1305. For example, as shown in FIG. 13B, the electronic device 101 may display guide information, such as "Set the TV to calibration mode and shoot it with the TV shown in the box below," 1311 thereby allowing the user to capture the display device 103. The electronic device 101 may display the image of the display device captured through the camera in a partial area 1313. The electronic device 101 may transmit a control signal to the display device 103 to display a specific image quality measurement pattern on the display device 103. For example, as shown in FIG. 13C, the electronic device 101 may display guide information, such as "Move the electronic device so that the distance and angle from the TV meets the image capturing condition" 1321, so that the user may move the electronic device 101 to the display device 103 to capture the partial area 1323 of the display device. The partial area 1323 of the display device may be a point measured to perform compensation when the display device 103 is produced, and may be one white point or R/G/B/W points. The partial area 1323 of the display device may output an R/G/B/Y/M/C screen to facilitate measurement of color among the optical information output by the display device 103 or may output a white pattern by the display device 103 to facilitate measurement of luminance among the optical information output by the display device 103. The electronic device 101 may compensate for the image captured for the display device 103. The electronic device 101 may display a screen for adjusting the optical information output from the display device 103. For example, as shown in FIG. 13D, the screen for adjusting the optical information may include adjustment setting information 1331 including components to be adjusted among the optical information output from the display device 103 and a reference value, context display information 1333 representing an image quality measurement pattern output from the display device 103, communication information 1335, and adjustment setting information 1337.

The adjustment setting information 1331 may include the components to be adjusted and the reference value. The components to be adjusted may be information indicating what is to be adjusted among the optical information output from the display device 103. The components to be adjusted may include one or more of luminance, color, uniformity of luminance or color, grayscale, gamma, and color space. It may be seen from FIG. 13D that the component to be adjusted is color. The user may add more components to be adjusted, other than color. The electronic device 101 may generate an adjustment signal according to the component to be adjusted, as set by the user, thereby allowing the image quality of the display device 103 to be adjusted according to various optical information characteristics.

The reference value is a target value indicating a value at which the image quality value should be changed to, and may be an absolute value set by the user. The electronic device 101 may generate an adjustment signal based on information necessary to change the measured image quality value into the reference value using the reference value.

According to an embodiment, the adjustment setting information 1331 may include information for selecting whether the setting mode is an absolute mode or a relative mode. The absolute mode means a mode in which the user may set the user's desired value as the target value as mentioned above, and the relative mode may be a mode in which the reference value is based not on an absolute value but on the image quality value of the display image corresponding to a specific ID. If the user selects the relative mode as the setting mode, the user needs to enter the ID number having the image quality value to be used as the reference value. Alternatively or additionally, when the user intends to use the image quality value of a specific area in the area corresponding to the specific ID, as the reference value, the user needs to enter location information for identifying the specific area along with the specific ID number.

The context display information 1333 may be information for displaying what pattern the display, which is the target for image capturing, outputs. The display device 103 may output optical information by outputting the image quality measurement pattern. The electronic device 101 may automatically recognize the image quality measurement pattern and select the component to be adjusted, according to the inter prediction mode. For example, if the display device 103 outputs a bright white pattern as the inter prediction mode, the electronic device 101 may be aware that the component to be measured is luminance and may measure the luminance among the image quality values.

The communication information 1335 is information for performing communication and may be access information for wired/wireless communication with the display device 103. For example, the communication information 1335 may be IP information for the display device 103 if the communication scheme is, e.g., Wi-Fi.

The adjustment setting information 1337 may be information for displaying the mode selected by the user. # included in the adjustment setting information 1337 may be information for indicating the number of times of measurement of image quality.

Although FIGS. 13A to 13D illustrate an example in which the compensation application is executed to compensate for the display device 103, FIGS. 13A to 13D are merely an example, and the embodiments are not limited thereto.

Figure 14:
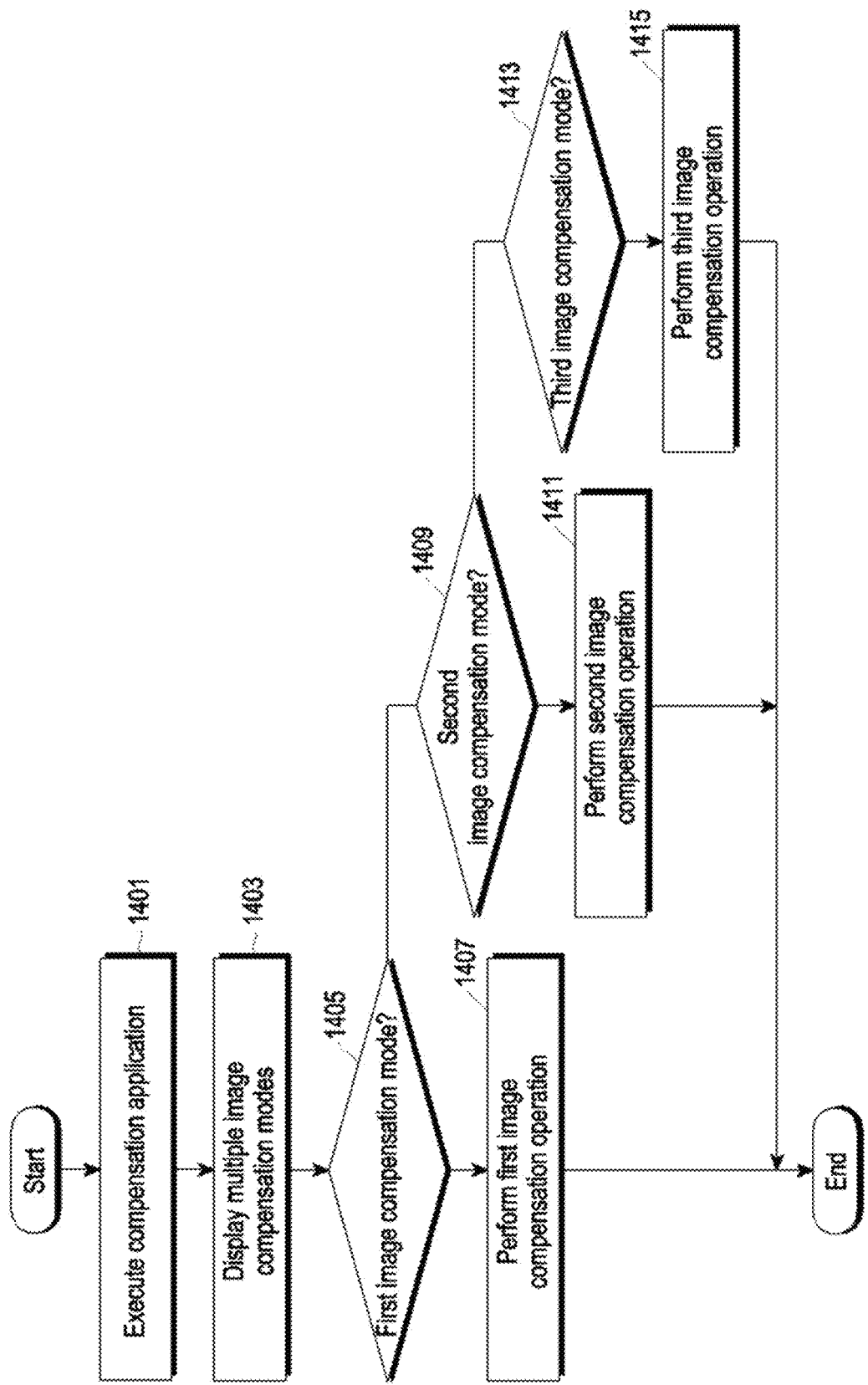
FIG. 14 is a flowchart illustrating a method of operation for image compensation on a display device by an electronic device according to various embodiments.

FIG. 14 is a flowchart illustrating a method of operation for image compensation on a display device by an electronic device according to various embodiments. The embodiment of FIG. 14 is described in more detail with reference to the embodiment of FIGS. 15, 16A to 16F, 17A to 17F, and 18. FIG. 15 is a view illustrating a plurality of image compensation modes for image compensation on a display device by an electronic device according to various embodiments. FIGS. 16A to 16F are views illustrating a first image compensation mode for image compensation on a display device by an electronic device according to various embodiments. FIGS. 17A to 17F are views illustrating a second image compensation mode for image compensation on a display device by an electronic device according to various embodiments. FIG. 18 is a view illustrating a third image compensation modes for image compensation on a display device by an electronic device according to various embodiments.

The operations of FIG. 14 is not limited to the presented order, and other operation(s) may intervene between the operations. Further, at least some of the operations of FIG. 14 may be omitted. In the disclosure, when the electronic device 101 performs a specific operation, the processor 210 of the electronic device 101 may perform the specific operation, or the processor 210 may control other hardware to perform the specific operation. In the disclosure, when the electronic device 101 performs a specific operation, instructions stored in the memory 220 may be executed to enable the processor 210 or other hardware to perform the specific operation, and instructions that trigger the specific operation may be stored in the memory 220.

According to various embodiments, the electronic device 101 (e.g., the processor 210) may execute the compensation application in operation 1401. For example, upon identifying selection of an icon representing the compensation application for compensating for an image of the display device among at least one icon representing at least one application displayed on the home screen, the electronic device 101 may execute the compensation application.

According to various embodiments, the electronic device 101 (e.g., the processor 210) may display a plurality of image compensation modes in operation 1403. As the compensation application is executed, the electronic device 101 may provide a plurality of image compensation modes including a first image compensation mode, a second image compensation mode, and a third image compensation mode for image compensation of the display device, which may be selected by the user.

The plurality of image compensation modes may include different image compensation times and image compensation methods all or some of which differ from each other. In the first image compensation mode among the plurality of image compensation modes, the image of the display device may be compensated by a first image compensation method during a first image compensation time. In the second image compensation mode among the plurality of image compensation modes, the image of the display device may be compensated by a second image compensation method during a second image compensation time different from the first image compensation time. The second image compensation method may include the whole or part of the first image compensation method or may be completely different from the first image compensation method. In the third image compensation mode among the plurality of image compensation modes, the image of the display device may be compensated by a third image compensation method during a third image compensation time different from the first image compensation time and the second image compensation time. The third image compensation method may include the whole or part of the first image compensation method and/or the second image compensation method or completely differ from the first image compensation method and/or the second image compensation method.

The first image compensation method of the first image compensation mode, the second image compensation method of the second image compensation mode, and the third image compensation method of the third image compensation mode may be different from, or partially identical to, each other in the type and/or number of image quality adjustment components for compensating for the image of the display device. The image adjustment components for compensating for the image of the display device may include, e.g., white balance, grayscale linearity, gamma, chromaticity, and/or EOTF of HDR signal. The image adjustment component for compensating for the image of the display device may be the same as the image adjustment component provided from the display device 103 to compensate for the image of the display device.

If the second image compensation mode among the plurality of image compensation modes is set as a default compensation mode, the first image compensation mode among the plurality of image compensation modes may be set to a quick compensation mode in which the image of the display device may be quickly compensated by the first image compensation method, which includes fewer adjustment components than the adjustment components included in the second image compensation method of the second image compensation mode, during the first image compensation time having an image compensation time shorter than the second image compensation time of the second image compensation mode. The third image compensation mode among the plurality of image compensation modes may be set to a professional compensation mode in which the image of the display device may be professionally compensated by the third image compensation method, which includes more adjustment components than the adjustment components included in the second image compensation method of the second image compensation mode, during the third image compensation time having an image compensation time longer than the second image compensation time of the second image compensation mode.

Among the plurality of image compensation modes, the higher image compensation mode may include the image compensation method of at least one lower image compensation mode. For example, the third image compensation method of the third image compensation mode among the plurality of image compensation modes may include the first image compensation method of the first image compensation mode, which is a lower image compensation mode than the third image compensation mode, and the second image compensation method of the second image compensation mode, which is also lower than the third image compensation mode. The second image compensation method of the second image compensation mode among the plurality of image compensation modes may include the first image compensation method of the first image compensation mode, which is the lower image compensation mode. The third image compensation mode may include at least one from among the first image compensation method and the second image compensation method.

For example, referring to FIG. 15, the electronic device 101 may display a plurality of image compensation modes including a first image compensation mode (e.g., Quick mode) 1501, a second image compensation mode (e.g., Basic mode) 1503, and a third image compensation mode (e.g., Professional mode) 1505, based on execution of the compensation application.

According to various embodiments, upon identifying selection of the first image compensation mode (e.g., the Quick mode 1501 of FIG. 15) among the plurality of image compensation modes in operation 1405, the electronic device 101 (e.g., the processor 210) may perform a first image compensation operation on the display device in operation 1407. The electronic device 101 may switch to the first image compensation mode for performing the first image compensation operation based on selection of the first image compensation mode (e.g., the Quick mode 1501 of FIG. 15).

Upon identifying selection of the first image compensation mode among the plurality of image compensation modes, the electronic device 101 may display, on the display of the electronic device, guide information (e.g., 1321 of FIG. 13C) to indicate movement of the electronic device to compensate for the image of the display device and, if the electronic device is moved so that the image capturing condition is met, switch to the first image compensation mode for performing the first image compensation operation.

The electronic device 101 may perform the first image compensation operation to compensate for the image of the display device as the image quality adjustment component included in the first image compensation method during a first image compensation time in the first image compensation mode for performing the first image compensation operation.

The electronic device 101 may display, on the display of the electronic device 101 and/or the display device 103, the process of performing the first image compensation operation in the first image compensation mode, via an intuitive user interface (UI) from the start until it is completed.

The electronic device 101 may perform the first image compensation operation on the display device 103 based on selection of the first image compensation mode and display, on the display of the electronic device 101, the process of performing the first image compensation operation on the display device 103 by the electronic device 101, via the intuitive UI from the start until it is completed.

The electronic device 101 may request the display device 103 to perform the first image compensation operation based on selection of the first image compensation mode by a user, and display, on the display of the electronic device 101, the process of performing the first image compensation operation on the display device received from the display device, via the intuitive UI from the start to finish.

For example, when the first image compensation mode (e.g., the Quick mode 1501 of FIG. 15) is selected, the first image compensation time is set to, e.g., 30 seconds, and the first image compensation method includes, e.g., 2-point white balance as the image quality adjustment component, the electronic device 101 may divide the grayscales into two levels from signal level 0 black to 255 full white for 30 seconds and compensate for the image of the display device while correcting the 2-point white balance which indicates the two levels.

For example, the first image compensation operation performed in the first image compensation mode (e.g., Quick mode) may be described by sequentially referring to FIGS. 16A to 16F.

Figure 16A:
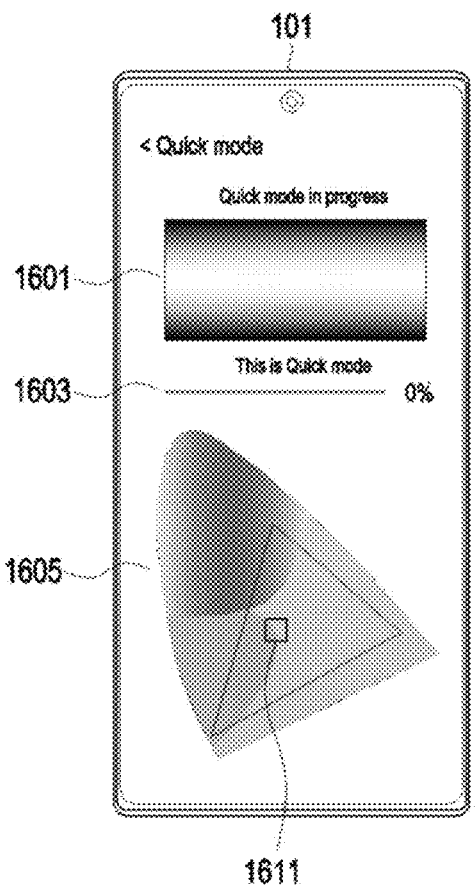
FIGS. 16A to 16F are views illustrating a first image compensation mode for image compensation on a display device by an electronic device according to various embodiments.

As shown in FIG. 16A, based on selection of the first image compensation mode (e.g., Quick mode), the electronic device 101 may display an image quality measurement pattern (e.g., a white pattern), which is output to correspond to the image adjustment component by the display device 103 captured through the camera 240 of the electronic device, in a first area 1601, display a processing progress rate for the first image compensation operation of the display device 103 in a second area, and display, in a third area 1605, a color distribution by which it may be known that the image adjustment target for compensating for the image of the display device 103 is color, thereby starting the first image compensation operation. The electronic device may display, in the color distribution of the third area 1605, a target point 1611 for completion of the first image compensation operation for the image of the display device.

Figure 16B:
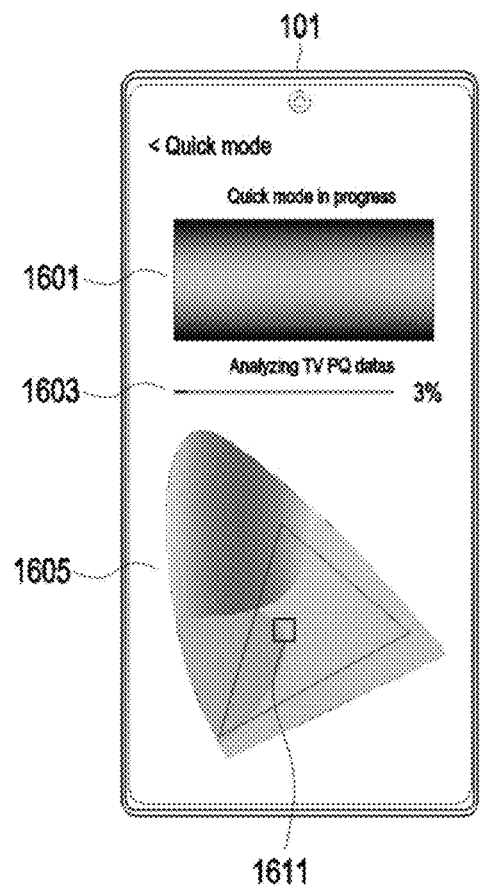
Figure 16C:
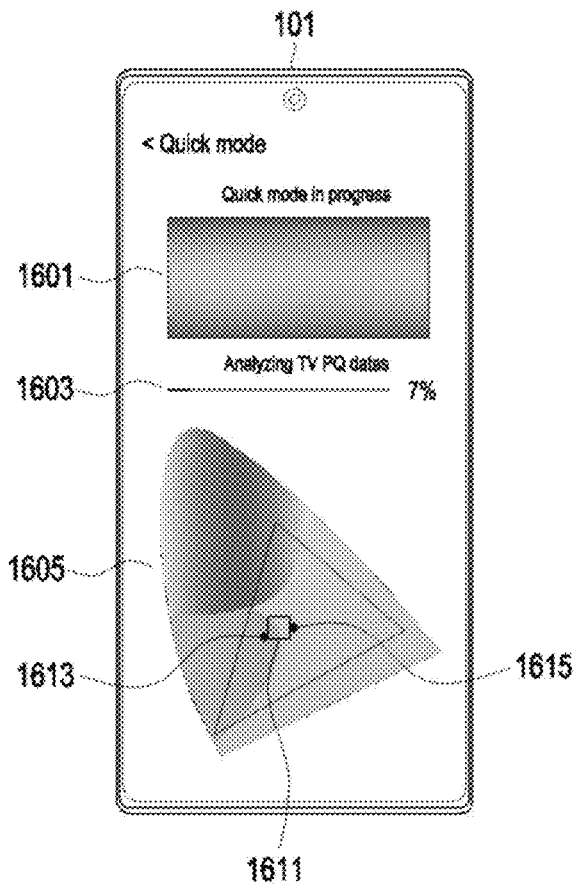

As shown in FIGS. 16A to 16C, the electronic device 101 may capture the image quality measurement pattern (e.g., an RGB pattern or white pattern) output on the display device 103 before compensating for the image of the display device, and the electronic device 101 may perform a process of obtaining the optimal dynamic range of the camera for optimal image capturing, such as iso, aperture, and/or shutter speed of the camera 240. As shown in FIG. 16C, the electronic device 101 may display, in the color distribution of the third area 1605, a first coordinate point 1613, which is measured by image capturing the image quality measurement pattern output from the display device before compensation for the image of the display device, and a second coordinate point 1615, which is measured by image capturing the image quality measurement pattern (e.g., a white pattern) output to correspond to the image adjustment component (e.g., 2-point white balance) included in the first image compensation method of the first image compensation mode for compensation for the image of the display device, along with the target point 1611.

Figure 16D:
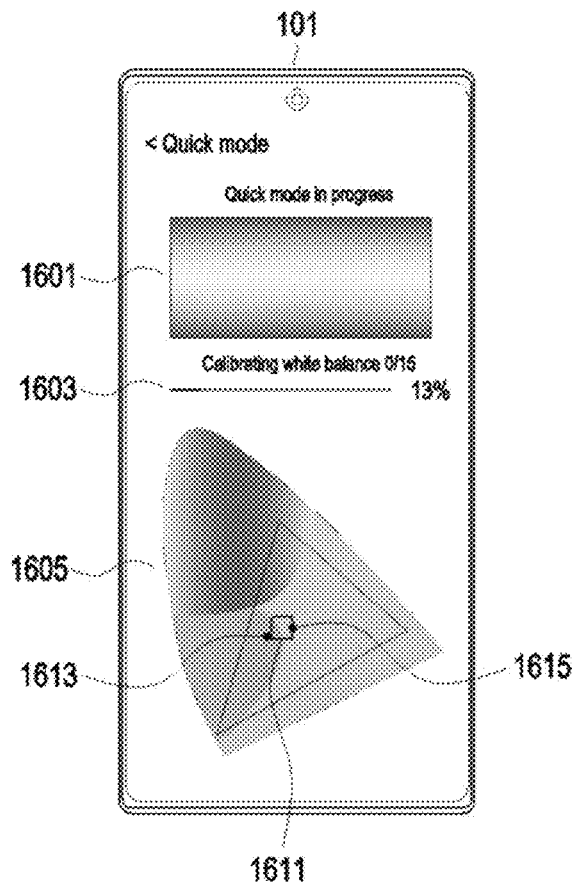
Figure 16E:
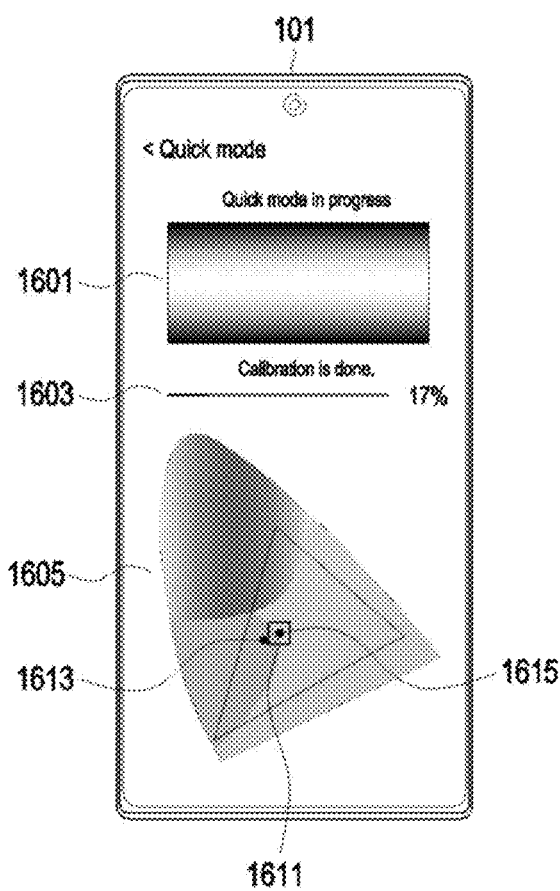
Figure 16F:
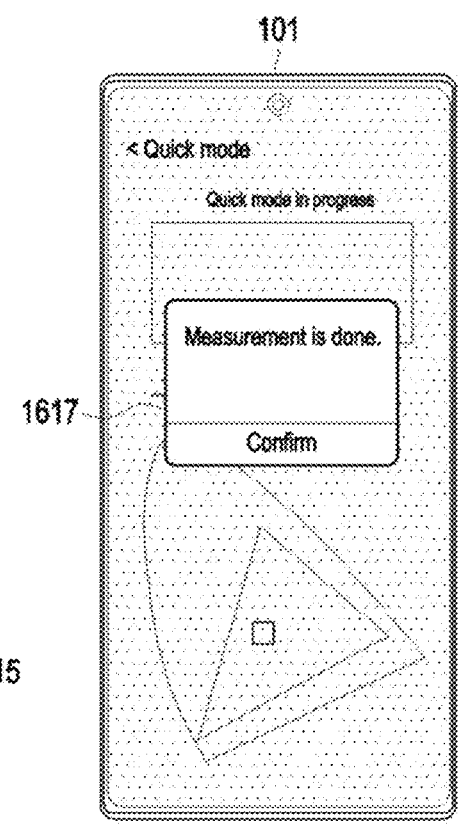

As shown in FIGS. 16D to 16F, the electronic device 101 may intuitively display, via the display of the electronic device, changes in the image quality of the display device through a compensation process for the image of the display device. As shown in FIG. 16D, the electronic device 101 may display the maximum number of attempts (e.g., 15) in which correction for the white balance is performed, in the second area 1603, display changes in number, by "1," from "0" as the attempts are made, and display the changes as the overall "%" progress rate. The overall time for the first image compensation operation may be adjusted according to adjustment of the maximum number of attempts.

As shown in FIGS. 16D to 16E, the electronic device 101 may display changes in the image quality of the display device as movement of the second coordinate point 1615 towards the target point 1611 as the first image compensation operation is performed.

As shown in FIG. 6E, if the first image compensation operation is completed, the electronic device 101 may display, in the second area 1603, that the maximum number of attempts (e.g., 15) for correction for the white balance have been completed, display, in the color distribution of the third area 1605, that the second coordinate point 1615 is positioned at the target point 1611, and as shown in FIG. 16F, display completion of the first image compensation operation as a message notification 1617.

Referring to FIGS. 16A to 16F, the target point 1611 may be displayed in square, but may be display in other various manners, and the square representing the target point 1611 may be resized according to adjustment of the total time for the first image compensation operation. For example, as the total time for the first image compensation operation decreases, the size of the square representing the target point 1611 may be displayed in a larger size corresponding to the total time.

According to various embodiments, upon identifying selection of the second image compensation mode (e.g., the Basic mode 1503 of FIG. 15) among the plurality of image compensation modes in operation 1409, the electronic device 101 (e.g., the processor 210) may perform a second image compensation operation on the display device in operation 1411. The electronic device 101 may switch to the second image compensation mode for performing the second image compensation operation according to selection of the second image compensation mode (e.g., the Basic mode 1503 of FIG. 15).

Upon receiving a command for selecting the second image compensation mode among the plurality of image compensation modes, the electronic device 101 may display, on the display of the electronic device, guide information (e.g., 1321 of FIG. 13C) to indicate movement of the electronic device to compensate for the image of the display device and, if the electronic device is moved so that the image capturing condition is met, switch to the second image compensation mode for performing the second image compensation operation.

The electronic device 101 may perform the second image compensation operation to compensate for the image of the display device as the image quality adjustment component included in the second image compensation method during a second image compensation time in the second image compensation mode for performing the second image compensation operation.

The electronic device 101 may display, on the display of the electronic device 101 and/or the display device 103, the progress of performing the second image compensation operation in the second image compensation mode, via an intuitive user interface (UI) from the start until it is completed.

The electronic device 101 may perform the second image compensation operation on the display device 103 according to selection of the second image compensation mode and display, on the display of the electronic device 101, the progress of performing the second image compensation operation on the display device 103 by the electronic device 101, via the intuitive UI from the start to finish.

The electronic device 101 may request the display device 103 to perform the second image compensation operation according to selection of the second image compensation mode, and display, on the display of the electronic device 101, the progress of performing the second image compensation operation on the display device received from the display device, via the intuitive UI from the start to finish.

For example, in the second image compensation mode (e.g., the Basic mode 1503 of FIG. 15), the second image compensation time is set to, e.g., 180 seconds, and the second image compensation method includes, e.g., 2-point white balance, 20-point white balance, grayscale linearity, and gamma, as image quality adjustment components, the electronic device may divide the grayscales into two levels from signal level 0 black to 255 full white, correct the white balance for each of the two points representing the two levels, divides the grayscales into 20 levels from signal level 0 black to 255 full white, correct the white balance for each of the 20 points representing the 20 levels, correct the 20 points to be distinguished for grayscale for grayscale linearity, and correct gamma, thereby compensating for the image of the display device.

For example, the second image compensation operation performed in the second image compensation mode (e.g., Basic mode) may be described by sequentially referring to FIGS. 17A to 17F.

The electronic device 101 may correct the white balance of two points, like in the first image compensation mode (e.g., Quick mode) as shown in FIGS. 16A to 16F. If correction of the 2-point white balance is completed, the electronic device 101 may perform gamma correction and correction of the white balance of 20 points as shown in FIGS. 17A to 17E. The electronic device 101 may omit display of the correction of the 2-point white balance in the second image compensation mode, as shown in FIGS. 16A to 16F and may display, on the electronic device, the correction of the 20-point white balance and the gamma correction, via a UI as shown in FIGS. 17A to 17E.

As shown in FIGS. 17A to 17E, the electronic device 101 may display, in a first area 1701, an image quality measurement pattern (e.g., a white pattern) output, to correspond to the image adjustment component, by the display device 103 captured through the camera 240 of the electronic device, display, in a second area 1703, a processing progress rate for the second image compensation operation of the display device 103, and display, in a third area 1705, the correction progress status using the gamma curve and dots, thereby displaying the current correction status in an intuitive UI while displaying the correction status for the 20-point white balance with dots along the gamma curve. The electronic device 101 may display, in a fifth area 1707, RGB bars for displaying the correction progress status via an additional UI. The electronic device 101 may display, in the fifth area 1707, the RGB bars for a visual understanding as to how much each of the RGB signals has been adjusted and whether it has currently been corrected to the desired target (e.g., gamma curve) whenever a point is displayed on the gamma curve in the fourth area 1705. The electronic device 101 may calculate the actual color temperature and actual color coordinates x and y and display them on the right side of the RGB bars in the fifth area 1707.

Figure 17A:
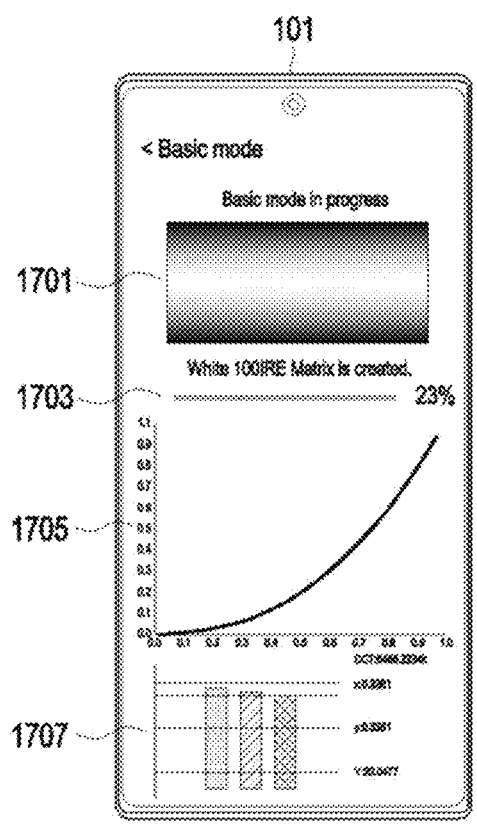
FIGS. 17A to 17F are views illustrating a second image compensation mode for image compensation on a display device by an electronic device according to various embodiments.
Figure 17B:
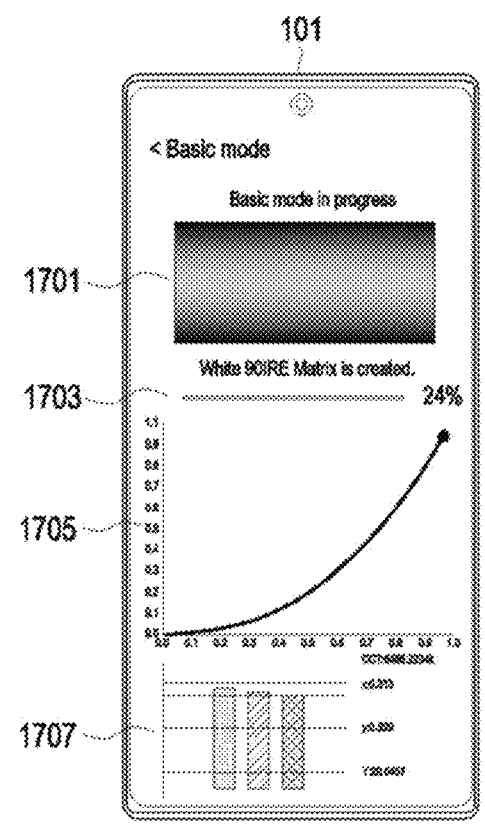
Figure 17C:
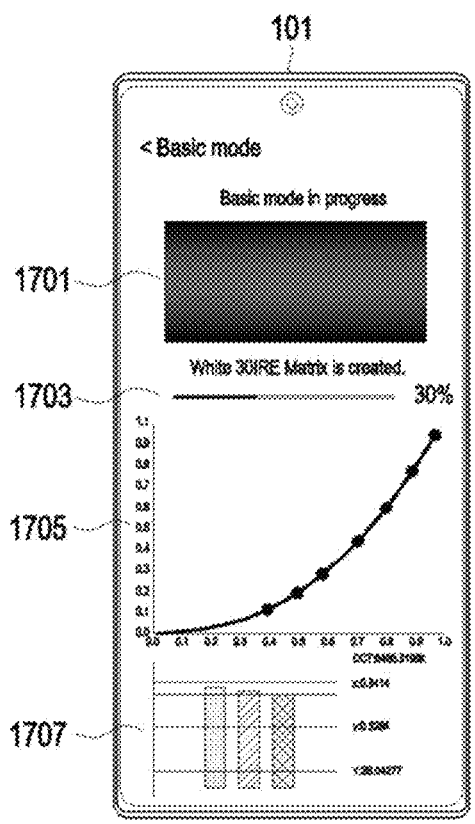
Figure 17D:
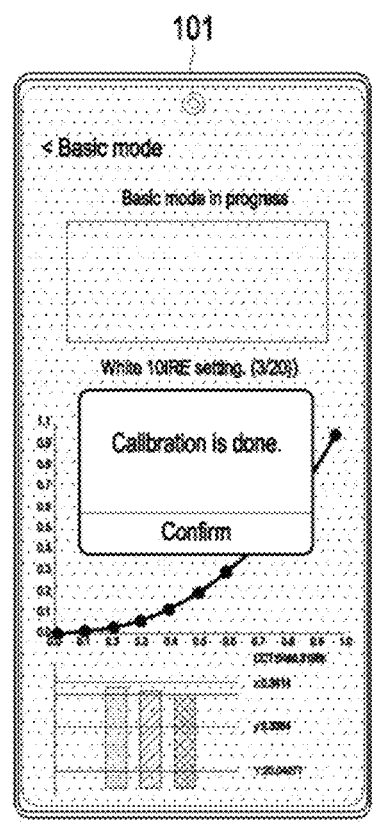
Figure 17E:
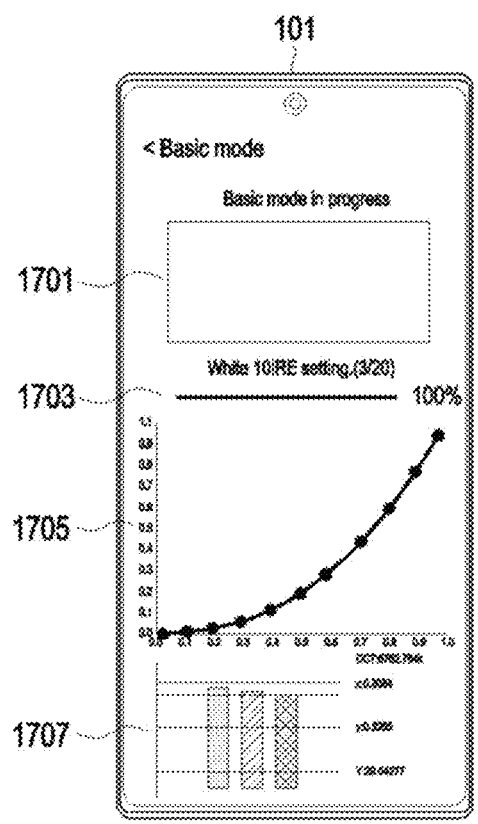
Figure 17F:
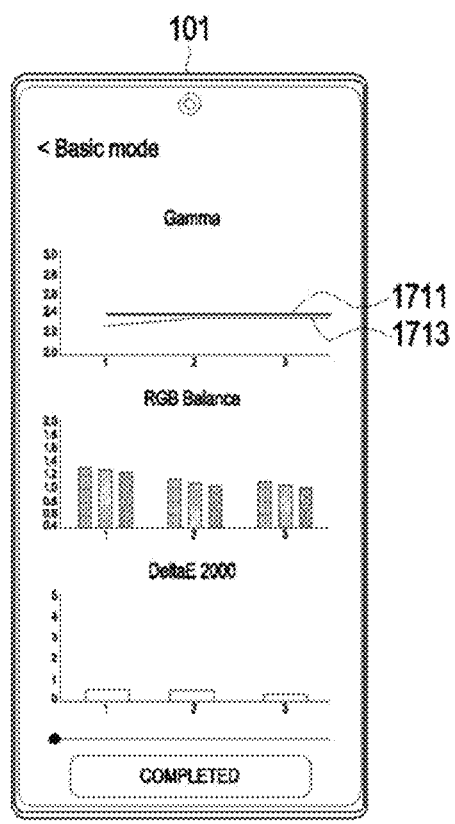
Figure 18:
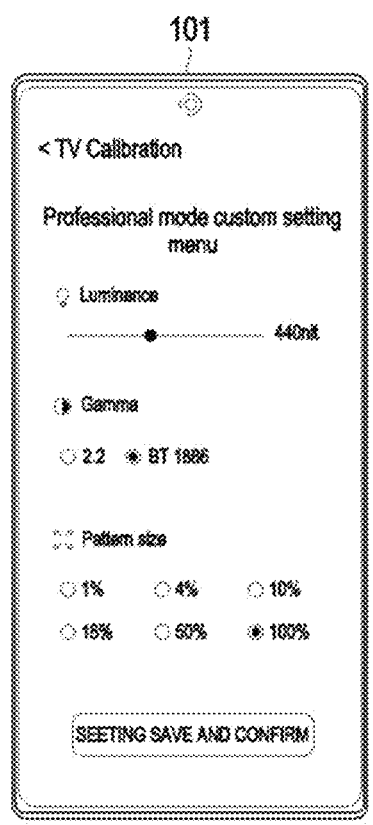
FIG. 18 is a view illustrating a third image compensation modes for image compensation on a display device by an electronic device according to various embodiments.

If correction of the 20-point white balance is completed as shown in FIG. 17E, the electronic device 101 may display a view report as shown in FIG. 17F. In the view report, the electronic device 101 may display the components of correction results (e.g., Gamma, RGB balance, and DeltaF2000) for the image adjustment components included in the second image compensation method of the second image compensation mode (e.g., Basic mode). For example, the gamma represents a brightness level of a pixel, and the accuracy of the gamma may be based on the difference between the reference point (target) 1711 and the correction result 1713, and DeltaE2000 may be a value representing a color different between the reference point 1711 and the correction result 1713 a smaller-the-better quality characteristic.

According to various embodiments, upon receiving a command for selecting the third image compensation mode (e.g., the Professional mode 1505 of FIG. 15) among the plurality of image compensation modes in operation 1413, the electronic device 101 (e.g., the processor 210) may perform a third image compensation operation on the display device in operation 1415. The electronic device 101 may switch to the third image compensation mode for performing the third image compensation operation according to selection of the third image compensation mode (e.g., the Professional mode 1505 of FIG. 15).

Upon receiving a command selecting the third image compensation mode among the plurality of image compensation modes, the electronic device 101 may display, on the display of the electronic device, guide information (e.g., 1321 of FIG. 13C) to indicate movement of the electronic device to compensate for the image of the display device and, if the electronic device is moved so that the image capturing condition is met, switch to the third image compensation mode for performing the third image compensation operation.

The electronic device 101 may perform the third image compensation operation to compensate for the image of the display device as the image quality adjustment component included in the third image compensation method during a third image compensation time in the third image compensation mode for performing the third image compensation operation.

The electronic device 101 may display, on the display of the electronic device 101 and/or the display device 103, the process of performing the third image compensation operation in the third image compensation mode, via an intuitive user interface (UI) from the start until it is completed.

The electronic device 101 may perform the third image compensation operation on the display device 103 according to selection of the third image compensation mode and display, on the display of the electronic device 101, the process of performing the third image compensation operation on the display device 103 by the electronic device 101, via the intuitive UI from the start until it is completed.

The electronic device 101 may request the communication-connected display device 103 to perform the third image compensation operation according to selection of the third image compensation mode and display, on the display of the electronic device 101, the process of performing the third image compensation operation on the display device received from the display device, via the intuitive UI from the start until it is completed.

If in the third image compensation mode (e.g., the Professional mode 1505 of FIG. 15), the third image compensation time is set to, e.g., 15 minutes, and the third image compensation method includes, e.g., 2-point white balance, 20-point white balance, grayscale linearity, gamma, chromaticity, and EOTF of HDR signal as image quality adjustment components, the electronic device may divide the grayscales into two levels from signal level 0 (black) to 255 (full white), correct the white balance for each of the two points representing the two levels, divide the grayscales into 20 levels from signal level 0 (black) to 255 (full white), correct the white balance for each of the 20 points representing the 20 levels, correct the 20 points to be distinguished for grayscale for grayscale linearity, correct gamma, chromaticity, and EOTF of the HDR signal, thereby compensating for the image of the display device.

The electronic device 101 may provide an additional setting menu screen for the image adjustment component, e.g., as shown in FIG. 18, based on selection of the third image compensation mode (e.g., Professional mode).

The setting menu screen as shown in FIG. 18 may include the luminance, gamma, and pattern size components, and the electronic device 101 may control the display device to display in the luminance selected by the user while compensating for the image of the display device. Unlike performing a correction process to adjust to a fixed gamma curve in the broadcast standard or other standards as in the second image compensation mode (e.g., Basic mode), the electronic device 101 may provide the gamma component to allow the user to select the type of the gamma curve. The electronic device 101 may provide the pattern size component to allow the user to select a specific size pattern unlike using a full raster pattern, which is a full display pattern, as in the second image compensation mode (e.g., Basic mode). As shown in FIG. 18, the electronic device 101 may provide an additional component for controlling the settings of the camera 240 of the electronic device which is capable of image capturing the image quality measurement pattern output from the display device and an component for adjusting the HDR signal on the configuration menu screen.

If configuration in the setting menu screen as shown in FIG. 18 is complete, the electronic device 101 may perform the second image compensation operation according to the second image compensation mode (e.g., Basic mode). While performing the second image compensation operation, the electronic device 101 may additionally adjust the luminance selected by the user in the luminance component of the configuration menu screen as shown in FIG. 18, change to the gamma curve shape selected by the user in the gamma component, and change and display the pattern size selected by the user in the pattern size component.

Figure 19A:
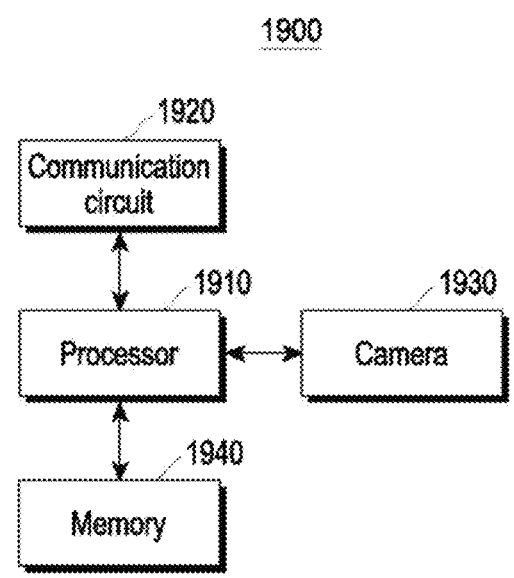
FIG. 19A is a block diagram schematically illustrating a configuration of a display device according to various embodiments.
Figure 19B:
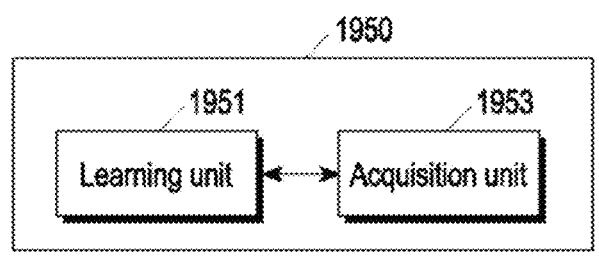
FIG. 19B is a block diagram illustrating an artificial intelligence model stored in a memory of a display device according to various embodiments.
Figure 20:
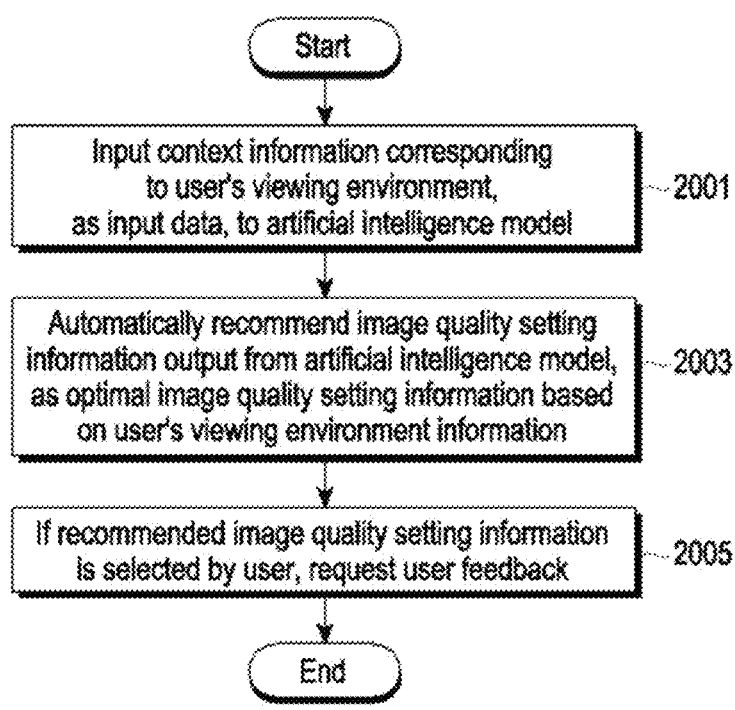
FIG. 20 is a flowchart illustrating a method of operation of a display device according to various embodiments.

FIG. 19A is a block diagram schematically illustrating a configuration of a display device according to various embodiments. FIG. 19B is a block diagram illustrating an artificial intelligence model stored in a memory of a display device according to various embodiments. FIG. 20 is a view illustrating an output of a message for a display device to request a user's feedback according to various embodiments.

Referring to FIG. 19A, a display device 1900 may include a processor 1910, a communication circuit 1920, and a display 1930.

The display device 1900 may be an electronic device (e.g., a smart TV) including a panel for displaying screen. For example, the panel included in the display device 1900 may be an LCD panel or one of panels including various light emitting devices, such as LED, OLED, or CCFL. Panels may be implemented as digital TVs, three-dimensional (3D)-TVs, smart TV, LED TVs, OLED TVs, or plasma TVs, and may be not only flat display devices but also curved display devices with curvature or flexible display devices which are curvature-adjustable.

The processor 1910 may control the overall operation of the display device 1900. The processor 1910 may execute, for example, software (e.g., a program) to control at least one other component (e.g., a hardware or software component) of the electronic device 101 coupled with the processor 1910, and may perform various data processing or computation. According to one embodiment, as at least part of the data processing or computation, the processor 1910 may store a command or data received from another component (e.g., the sensor module or communication module or a sensor module) onto a volatile memory, process the command or the data stored in the volatile memory, and store resulting data in a non-volatile memory. According to an embodiment, the processor 1910 may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor. For example, when the display device 1900 includes the main processor and the auxiliary processor, the auxiliary processor may be configured to use lower power than the main processor or to be specified for a designated function. The auxiliary processor may be implemented as separate from, or as part of the main processor.

In particular, the processor 1910 may execute at least one instruction stored in the memory 1940, thereby determining context information and determining image quality setting information corresponding to the context information. The context information may include at least one of time information, location information, weather information, environment information, preference information and content information, and display device feature information. The time information may be information related to the date, day, and time when the display device outputs a screen. The location information may be information related to the country, latitude, and equator where the display device is located. The environment information may be information about luminance in the surrounding of the display device while the display device outputs a screen, and may be, e.g., information about indoor lighting where the display device may be viewed. The preference information may include the time zone for display of the screen output from the display device, image quality setting information set by the user, information for the source (e.g., cable, mirroring, OTT, or app) of the output screen, image quality information preferred in the user's region, and/or image quality information preferred by the people in the region where the display device is located. The content information may be information regarding the type of content preferred by the user. The feature information for the display device may include display model information and image quality-related information corresponding to the model information.

The processor 1910 may determine image quality setting information corresponding to the context information using an artificial intelligence (AI) model stored in the memory 1940. In this case, the artificial intelligence model may be trained based on at least one of the user interaction input to the display device 1900, the user's image quality setting history, environment information sensed by the display device 1900, and information received from an external device (e.g., an electronic device or a server). Specifically, the processor 1910 may obtain image quality setting information corresponding to the context information by inputting the context information to the artificial intelligence model.

Specifically, referring to FIG. 19B, the artificial intelligence model 1950 stored in the memory of the display device 1900 may include a learning unit 1951 and an acquisition unit 1953. The processor 1910 may execute the learning unit 1951 stored in the memory 1940 to learn a reference for generating context information. The learning unit 1951 may obtain context information based on at least one of the user interaction, the user's image quality setting history, sensing information sensed by the display device 1900, and information received from an external device. For example, the learning unit 1951 may determine the user's image quality setting information for each mode of the screen output from the display device 1900, information for the source (e.g., cable, mirroring, OTT, or app) of the output screen, information related to the model and image quality of the display device 1900, environment information representing ambient luminance and chromaticity distribution of the display device 1900, time zone when the display device 1900 is used, the location (country, city, latitude, or equator) of the display device 1900, the ambient illuminance and chromaticity information sensed by the electronic device connected with the display device 1900, and the type of content of the output screen and, accordingly, generate the context information.

The processor 1910 may execute the acquisition unit 1953 stored in the memory 1940, allowing an artificial intelligence model to obtain image quality information based on a keyword, which is input data. The acquisition unit 1953 may obtain image quality information reflecting the user's tendency information or preference information from predetermined input data using the trained artificial intelligence model. The acquisition unit 1953 may obtain predetermined input data according to a preset criterion and apply the obtained input data, as an input value, to the artificial intelligence model, thereby determining a predetermined output based on the predetermined input data. Further, a result value output by applying the obtained input data, as an input value, to the artificial intelligence model may be used to update the artificial intelligence model.

At least part of the learning unit 1951 and at least part of the acquisition unit 1953 may be implemented as software modules or produced in at least one hardware chips that may be equipped in the display device 1900. For example, at least one of the learning unit 1951 and the acquisition unit 1953 may be formed in a dedicated hardware chip for artificial intelligence (AI) or in part of an existing general-purpose processor (e.g., a central processing unit (CPU) or application processor) or a graphic dedicated processor (e.g., graphics processing unit (GPU)) and be equipped in the above-described server. In this case, the dedicated hardware chip for artificial intelligence may be a dedicated processor specified for probability computation, which may quickly process artificial intelligence computation tasks, e.g., machine learning, with a better parallel processing performance than existing general-purpose processors. Where the learning unit 1951 and the acquisition unit 1953 are implemented in software modules (or program modules including instructions), the software module may be stored in a non-transitory computer-readable recording medium. In this case, the software modules may be provided by an operating system (OS) or by a predetermined application. Some of the software modules may be provided by the OS, and others may be provided by the predetermined application.

Further, the learning unit 1951 and the acquisition unit 1953 may be equipped in one server or individually in separate servers. For example, one of the learning unit 1951 and the acquisition unit 1953 may be included in a first server, and the other may be included in a second server. Further, the learning unit 1951 and the acquisition unit 1953 may wiredly or wirelessly provide model information built by the learning unit 1951 to the acquisition unit 1953, and the data input to the acquisition unit 1951, as additional learning data, may be provided to the learning unit 1953.

The artificial intelligence model may be established given, e.g., the field of application, the purpose of learning, or the computation performance of the device. The artificial intelligence model may be, e.g., a model based on a neural network. The artificial intelligence model may be designed to simulate the human brain structure on a computer. The artificial intelligence model may include a plurality of weight-assigned network nodes mimicking the neurons of the human neural network. The plurality of network nodes may form connections to simulate the synaptic activity of neurons to exchange signals through the synapses. The artificial intelligence model may include, e.g., a neural network model or a deep learning model as an advanced version of the neural network model. In the deep learning model, a plurality of network nodes may be positioned at different depths (or layers) to exchange data as per convolution connections. For example, the deep neural network (DNN), recurrent neural network (RNN), bi-directional recurrent deep neural network (BRDNN), long short term memory network (LSTM), or such types of models may be used as the data recognition model, but not limited thereto.

Based on the artificial intelligence model 1950 that has generated context information via training, the processor 1910 does not perform image quality adjustment on the display device but may recommend the viewing user for the optimal image quality setting information based on the user's viewing environment information. The processor 1910 may recommend different optimal image quality setting information based on the image quality setting information for the display device selected by the user. For example, if the user has selected first image quality setting information on the display device but views without adjusting the image quality for the display device, the processor 1910 may recommend, as the optimal image quality setting information, a global setting value capable of adjusting the image quality of the display device for which the first image quality setting information has been selected according to the type of content being viewed by the user or the user's viewing environment.

The processor 1910 may input the context information corresponding to the user's viewing environment, as input data, to the artificial intelligence model 1950 and, based on the input data, may automatically recommend the image quality setting information output from the artificial intelligence model 1950 as the optimal image quality setting information based on the user's viewing environment information.

Upon receiving, as input data, at least one of time information (e.g., the screen output time of the display device), location information (e.g., information for the region where the display device is located), environment information (e.g., indoor lighting information about where the display device is located), preference information (e.g., image quality information preferred by the people in the region where the display device is located), content information (e.g., content information to be viewed by the user), and feature information (e.g., display model information) for the display device, as the context information corresponding to the user's viewing environment information, the artificial intelligence model 1950 may combine the at least one input data and output the image quality setting information corresponding to the at least one combined input data among the plurality of image quality setting information, as the optimal image quality setting information based on the viewing environment information.

The artificial intelligence model 1950 may configure a plurality of user groups depending on the user's viewing environment and configure a plurality of image quality setting information corresponding to the plurality of user groups.

Upon receiving context information corresponding to the user's viewing environment, as input data, the artificial intelligence model 1950 may determine one user group (e.g., a first user group) including the input data among the plurality of user groups (e.g., a first user group to a fifth user group) and output image quality setting information (e.g., the first image quality setting information) corresponding to the user group (e.g., the first user group) determined among the plurality of image quality setting information (e.g., the first image quality setting information to the fifth image quality setting information), as the optimal image quality information based on the user's current viewing environment information.

The processor 1910 may automatically recommend the image quality setting information to the user, case-by-case, according to the context information input, as input data, based on the artificial intelligence model 1950, and as the artificial intelligence model 1950 is trained based on the user's feedback (e.g., satisfaction score) for the recommended image quality setting information and the user's selection frequency, the optimal image quality setting information based on the indoor user may be recommended later.

Upon recommending subsequent image quality information based on the user's feedback and the user's selection frequency, the processor 1910 may recommend in a first mode (e.g., picture mode) for basic image quality setting information and a second mode (e.g., expert settings mode) for detailed image quality setting information.

The communication circuit 1920 may communicate with an external electronic device. The communication circuit 1920 is a component for performing communication with an external device. Communication connection to an external device by the communication circuit 1920 may include communication via a third device (e.g., a relay, hub, access point, server, or gateway). The wireless communication may include cellular communication using at least one of, e.g., long-term evolution (LTE), LTE-advanced (LTE-A), code division multiple access (CDMA), wideband CDMA (WCDMA), universal mobile telecommunications system (UNITS), wireless broadband (WiBro), or global system for mobile communications (GSM). According to an embodiment, the wireless communication may include at least one of, e.g., wireless fidelity (Wi-Fi), Bluetooth, Bluetooth low power (BLE), Zigbee, near field communication (NEC), magnetic secure transmission (MST), radio frequency, or body area network (BAN). The wired connection may include at least one of, e.g., universal serial bus (USB), high definition multimedia interface (HDMI), recommended standard (RS)-232, power line communication (PLC), or plain old telephone service (POTS). The network where wireless communication or wired communication is performed may include at least one of telecommunication networks, e.g., a computer network (e.g., local area network (LAN) or wide area network (WAN)), Internet, or a telephone network.

The communication circuit 1920 may communicate with an external server and provide an artificial intelligence service. For example, the artificial intelligence service may provide one or more artificial intelligence model to learn and perform any of the operations according to the embodiments provided above. In particular, the communication circuit 1920 may transmit at least part of context information to the external server and receive image quality setting information corresponding to the context information.

The display 1930 may output screen based on the determined image quality setting information.

Figure 21:
FIG. 21 is a view illustrating an output of a message for a display device to request a user's feedback according to various embodiments.

FIG. 20 is a flowchart illustrating a method of operation of a display device according to various embodiments. FIG. 21 is a view illustrating an output of a message for a display device to request a user's feedback according to various embodiments.

The operations of FIG. 20 is not limited in order, and other operation(s) may intervene between two adjacent operations. Further, at least some of the operations of FIG. 20 may be omitted. In the disclosure, when the display device 1900 performs a specific operation, the processor 1910 of the display device 1900 may perform the specific operation, or the processor 1910 may control other hardware to perform the specific operation. In the disclosure, when the display device 1900 performs a specific operation, instructions stored in the memory 1940 may be executed to enable the processor 1910 or other hardware to perform the specific operation, and instructions that trigger the specific operation may be stored in the memory 1940.

According to various embodiments, in operation 2001, the display device 1900 (e.g., the processor 1910) may input context information corresponding to the user's viewing environment, as input data, to the artificial intelligence model. Unless the user of the display device adjusts the image quality, the display device 1900 may detect the context information corresponding to the user's viewing environment. As the context information, the display device 1900 may input, to the artificial intelligence model 1950 included in the memory 1940, at least one of time information (e.g., the screen output time of the display device), location information (e.g., information for the region where the display device is located), environment information (e.g., indoor lighting information about where the display device is located), preference information (e.g., image quality information preferred by the people in the region where the display device is located), content information (e.g., content information to be viewed by the user), and feature information (e.g., display model information) for the display device, as input information.

According to various embodiments, the display device 1900 (e.g., the processor 1910) may automatically recommend the image quality setting information output from the artificial intelligence model, as the optimal image quality setting information based on the user's viewing environment information, in operation 2003. If the artificial intelligence model 1950 outputs the image quality setting information corresponding to the input data (context information) among the plurality of image quality setting information, the display device 1900 may automatically recommend the output image quality setting information as the optimal image quality setting information based on the user's current viewing environment information.

According to various embodiments, the display device 1900 (e.g., the processor 1910) may request the user's feedback if the recommended image quality information is selected by the user in operation 2005. As the artificial intelligence model 1950 is trained based on the user's selection frequency and the user's feedback (e.g., satisfaction score) for the recommended image quality information, the display device 1900 may provide further optimized image quality setting information to the user later. As shown in FIG. 21, if the image quality setting information recommended by the display device 1900 is selected by the user, the display device 1900 may display a message 2100 for requesting the user's feedback (e.g., the user's satisfaction) on the display 1930. If the user's feedback is input through the message 2100, the artificial intelligence model 1950 is trained based on the user's feedback (e.g., satisfaction score), and the display device 1900 may recommend further optimized image quality setting information to the user later.

According to various embodiments, an electronic device includes a communication circuit, a camera, and at least one processor configured to output guide information to request the electronic device to move to meet an image capturing condition for image capturing a partial area of a display device connected through the communication circuit, based on execution of a compensation application for compensating for an image of the display device, and if compensation for the image of the display device is completed, output an image of the display device before the compensation and the image of the display device after the compensation.

According to various embodiments, the processor may be configured to, if the compensation application is determined to be executed, output a plurality of image compensation modes for compensating for the image of the display device, and upon identifying selection of an image compensation mode from among the plurality of image compensation modes, output the guide information to request the electronic device to move to meet the image capturing condition for image capturing the partial area of the display device.

According to various embodiments, the processor may be configured to, if the image capturing condition is met in a first image compensation mode among the plurality of image compensation modes, display, through a display, a process of performing an image compensation operation on the display device by a first image compensation method during a first image compensation time, if the image capturing condition is met in a second image compensation mode among the plurality of image compensation modes, display, through a display, a process of performing the image compensation operation on the display device by a second image compensation method during a second image compensation time, and if the image capturing condition is met in a third image compensation mode among the plurality of image compensation modes, display, through a display, a process of performing the image compensation operation on the display device by a third image compensation method during a third image compensation time.

According to various embodiments, the first image compensation time, the second image compensation time, and the third image compensation time may include different times.

According to various embodiments, each of the first image compensation method, the second image compensation method, and the third image compensation method may include at least one image quality adjustment component for image compensation for the display device.

According to various embodiments, the first image compensation method, the second image compensation method, and the third image compensation method may include different or partially identical, in type and number, image adjustment components among the at least one image adjustment component.

According to various embodiments, the processor may be configured to, if the image capturing condition is met in the first image compensation mode, obtain an image including the partial area of the display device using the camera, and display the process of performing the image compensation operation on the display device, through the display, based on the obtained image. The partial area of the display device may be configured to output a specific image quality pattern corresponding to the image adjustment component included in the first image compensation method.

According to various embodiments, the processor may be configured to, if the image capturing condition is met in the second image compensation mode, obtain an image including the partial area of the display device using the camera, and display the process of performing the image compensation operation on the display device, through the display, based on the obtained image. The partial area of the display device may be configured to output a specific image quality pattern corresponding to the image adjustment component included in the second image compensation method.

According to various embodiments, the processor may be configured to, if the image capturing condition is met in the third image compensation mode, obtain an image including the partial area of the display device using the camera, and display the process of performing the image compensation operation on the display device, through the display, based on the obtained image. The partial area of the display device may be configured to output a specific image quality pattern corresponding to the image adjustment component included in the third image compensation method.

According to various embodiments, the partial area of the display device may include a specific point for compensating for the image of the display device.

According to various embodiments, a method for operating an electronic device including a camera includes outputting guide information to request the electronic device to move to meet an image capturing condition for image capturing a partial area of a display device connected through a communication circuit of the electronic device, based on execution of a compensation application for compensating for an image of the display device, and if compensation for the image of the display device is completed, outputting an image of the display device before the compensation and the image of the display device after the compensation.

According to various embodiments, outputting the guide information may include, if the compensation application is determined to be executed, outputting a plurality of image compensation modes for compensating for the image of the display device, and upon identifying selection of an image compensation mode from among the plurality of image compensation modes, outputting the guide information to request the electronic device to move to meet the image capturing condition for image capturing the partial area of the display device.

According to various embodiments, the method may further include, if the image capturing condition is met in a first image compensation mode among the plurality of image compensation modes, displaying, through a display, a process of performing an image compensation operation on the display device by a first image compensation method during a first image compensation time, if the image capturing condition is met in a second image compensation mode among the plurality of image compensation modes, displaying, through a display, a process of performing the image compensation operation on the display device by a second image compensation method during a second image compensation time, and if the image capturing condition is met in a third image compensation mode among the plurality of image compensation modes, displaying, through a display, a process of performing the image compensation operation on the display device by a third image compensation method during a third image compensation time.

According to various embodiments, the first image compensation time, the second image compensation time, and the third image compensation time may include different times.

According to various embodiments, each of the first image compensation method, the second image compensation method, and the third image compensation method may include at least one image quality adjustment component for image compensation for the display device.

According to various embodiments, the first image compensation method, the second image compensation method, and the third image compensation method may include different or partially identical, in type and number, image adjustment components among the at least one image adjustment component.

According to various embodiments, the method may further includes, if the image capturing condition is met in the first image compensation mode, obtaining an image including the partial area of the display device using the camera, and displaying the process of performing the image compensation operation on the display device, through the display, based on the obtained image. The partial area of the display device may be configured to output a specific image quality pattern corresponding to the image adjustment component included in the first image compensation method.

According to various embodiments, the method may further includes, if the image capturing condition is met in the second image compensation mode, obtaining an image including the partial area of the display device using the camera, and displaying the process of performing the image compensation operation on the display device, through the display, based on the obtained image. The partial area of the display device may be configured to output a specific image quality pattern corresponding to the image adjustment component included in the second image compensation method.

According to various embodiments, the method may further includes, if the image capturing condition is met in the third image compensation mode, obtaining an image including the partial area of the display device using the camera, and displaying the process of performing the image compensation operation on the display device, through the display, based on the obtained image. The partial area of the display device may be configured to output a specific image quality pattern corresponding to the image adjustment component included in the third image compensation method.

According to various embodiments, the partial area of the display device may include a specific point for compensating for the image of the display device.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 190) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a display;
a communication circuit;
a camera; and
at least one processor configured to:
based on an execution of a compensation application for performing compensation on an image of a display device, control the display to output guide information including an interface indicating the electronic device to move to meet an image capturing condition for capturing an image of a partial area of a display device connected through the communication circuit; and
based on the compensation of the image of the display device being completed, output a first image of the display device before the compensation and a second image of the display device after the compensation.

2. The electronic device of claim 1, wherein the at least one processor is further configured to:
based on the compensation application being executed, output a plurality of image compensation modes for compensating the image of the display device; and
based on receiving a command for selecting one of the plurality of image compensation modes, control the display to output the guide information including the interface indicating a direction in which the electronic device needs to move to meet the image capturing condition for image capturing the partial area of the display device.

3. The electronic device of claim 2, wherein the at least one processor is further configured to:
based on the image capturing condition being met in a first image compensation mode among the plurality of image compensation modes, control the display to display a progress of performing a first image compensation method corresponding to the first image compensation mode on the display device during a first image compensation time;
based on the image capturing condition being met in a second image compensation mode among the plurality of image compensation modes, control the display to display a progress of performing a second image compensation method corresponding to the second image compensation mode on the display device during a second image compensation time; and
based on the image capturing condition being met in a third image compensation mode among the plurality of image compensation modes, control the display to display a progress of performing a third image compensation method corresponding to the third image compensation mode on the display device during a third image compensation time,
wherein the first image compensation time, the second image compensation time, and the third image compensation time are different, and
wherein each of the first image compensation method, the second image compensation method, and the third image compensation method includes at least one image quality adjustment component for performing the compensation of the image of the display device.

4. The electronic device of claim 3, wherein the first image compensation method, the second image compensation method, and the third image compensation method, each include an image adjustment component among the at least one image adjustment component that is different from each other.

5. The electronic device of claim 3, wherein the at least one processor is further configured to:
based on the image capturing condition being met in the first image compensation mode, obtain a third image including the partial area of the display device using the camera; and
control the display to display the progress of performing the compensation of the image of the display device based on the third image,
wherein the partial area of the display device is configured to output a specific image quality pattern corresponding to an image adjustment component included in the first image compensation method.

6. The electronic device of claim 3, wherein the at least one processor is further configured to:
based on the image capturing condition being met in the second image compensation mode, obtain a fourth image including the partial area of the display device using the camera; and
control the display to display the progress of performing the compensation of the image of the display device based on the fourth image,
wherein the partial area of the display device is configured to output a specific image quality pattern corresponding to an image adjustment component included in the second image compensation method.

7. The electronic device of claim 3, wherein the at least one processor is further configured to:
based on the image capturing condition being met in the third image compensation mode, obtain a fifth image including the partial area of the display device using the camera; and
control the display to display the progress of performing the compensation of the image of the display device, based on the fifth image, wherein the partial area of the display device is configured to output a specific image quality pattern corresponding to an image adjustment component included in the third image compensation method.

8. The electronic device of claim 1, wherein the partial area of the display device includes a specific point for compensating the image of the display device.

9. A method for operating an electronic device including a display and a camera, the method comprising:

based on an execution of a compensation application for performing compensation on an image of a display device, outputting, on the display, guide information including an interface indicating the electronic device to move to meet an image capturing condition for capturing an image of a partial area of a display device connected through a communication circuit of the electronic device; and based on the compensation of the image of the display device being completed, outputting a first image of the display device before the compensation and a second image of the display device after the compensation.

10. The method of claim 9, wherein the outputting the guide information comprises:

based on the compensation application being executed, outputting a plurality of image compensation modes for compensating the image of the display device; and based on receiving a command for selecting one of the plurality of image compensation modes, controlling the display to output the guide information including the interface indicating a direction in which the electronic device needs to move to meet the image capturing condition for capturing the partial area of the display device.

11. The method of claim 10, further comprising:

based on the image capturing condition being met in a first image compensation mode among the plurality of image compensation modes, controlling the display to display a progress of performing a first image compensation method corresponding to the first image compensation mode on the display device during a first image compensation time;

based on the image capturing condition being met in a second image compensation mode among the plurality of image compensation modes, controlling the display to display a progress of performing a second image compensation method corresponding to the second image compensation mode on the display device during a second image compensation time; and based on the image capturing condition being met in a third image compensation mode among the plurality of image compensation modes, controlling the display to display a progress of performing a third image compensation method corresponding to the third image compensation mode during a third image compensation time, wherein the first image compensation time, the second image compensation time, and the third image compensation time are different, and wherein each of the first image compensation method, the second image compensation method, and the third image compensation method includes at least one image quality adjustment component for performing the compensation of the image of the display device.

12. The method of claim 11, further comprising:

based on the image capturing condition being met in the first image compensation mode, obtaining a third image including the partial area of the display device using the camera; and controlling the display to display the progress of performing the compensation of the image of the display device, based on the third image, wherein the partial area of the display device is configured to output a specific image quality pattern corresponding to an image adjustment component included in the first image compensation method.

13. The method of claim 11, further comprising:

based on the image capturing condition being met in the second image compensation mode, obtaining a fourth image including the partial area of the display device using the camera; and controlling the display to display the progress of performing the compensation of the image of the display device, based on the fourth image, wherein the partial area of the display device is configured to output a specific image quality pattern corresponding to an image adjustment component included in the second image compensation method.

14. The method of claim 11, further comprising:

based on the image capturing condition being met in the third image compensation mode, obtaining a fifth image including the partial area of the display device using the camera; and controlling the display to display the progress of performing the compensation of the image of the display device, based on the fifth image, wherein the partial area of the display device is configured to output a specific image quality pattern corresponding to an image adjustment component included in the third image compensation method.

15. The method of claim 9, wherein the partial area of the display device includes a specific point for compensating the image of the display device.

* * * * *